United States Patent
Kamohara et al.

(10) Patent No.: US 9,145,493 B2
(45) Date of Patent: Sep. 29, 2015

(54) FILM, ITS PRODUCTION METHOD, AND POLARIZER AND LIQUID CRYSTAL DISPLAY DEVICE USING THE FILM

(71) Applicant: FUJIFILM Corporation, Tokyo (JP)

(72) Inventors: Kazuo Kamohara, Kanagawa (JP); Katsumi Sasata, Kanagawa (JP); Nobutaka Fukagawa, Kanagawa (JP); Masaki Noro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 205 days.

(21) Appl. No.: 13/663,933

(22) Filed: Oct. 30, 2012

(65) Prior Publication Data
US 2013/0107175 A1  May 2, 2013

(30) Foreign Application Priority Data

Oct. 31, 2011 (JP) .................. 2011-238232
Aug. 27, 2012 (JP) .................. 2012-186406

(51) Int. Cl.
*C09D 101/02* (2006.01)
*C08L 1/12* (2006.01)
(Continued)

(52) U.S. Cl.
CPC .............. *C08L 1/12* (2013.01); *C09D 101/02* (2013.01); *B32B 2457/202* (2013.01); *C08L 1/14* (2013.01); *G02F 1/133528* (2013.01); *Y10T 428/105* (2015.01); *Y10T 428/31971* (2015.04)

(58) Field of Classification Search
CPC .. C09D 101/00; C09D 101/02; C09D 101/08; C09D 101/10; C09D 101/12; C09D 101/14; B32B 17/08; B32B 17/10; B32B 223/00; B32B 23/004; B32B 23/08; B32B 23/14; B32B 23/16; B32B 23/20; B32B 2457/202; C08L 1/12; C08L 1/14; G02F 1/1335; G02F 1/133528; G02B 5/30; G02B 5/3041; G02B 5/305; Y10T 428/105; Y10T 428/31971
USPC ........ 349/96; 106/200.1; 428/1.31, 1.33, 533, 428/534
See application file for complete search history.

(56) References Cited

U.S. PATENT DOCUMENTS 6,727,300 B2 *  4/2004  Sassi ............................. 524/103
2006/0069192 A1  3/2006  Nakamura et al.
(Continued)

FOREIGN PATENT DOCUMENTS

JP  2001072782 A  *  3/2001  .................. C08J 5/18
JP  2005096095 A  *  4/2005  .............. B32B 23/20
(Continued)

OTHER PUBLICATIONS

Kabahara et al., JP 2011116113 A, English Machine Translation provided by: http://dossier1.ipdl.inpit.go.jp/AIPN/odse_top_dn.ipdl?N0000=7400.*
(Continued)

*Primary Examiner* — Erik Kashnikow
*Assistant Examiner* — Eli D Strah
(74) *Attorney, Agent, or Firm* — Jean C. Edwards, Esq.; Edwards Neils PLLC

(57) ABSTRACT

A film containing a cellulose acylate, a hindered amine compound at least 0.001% by mass relative to the cellulose acylate, and a plasticizer, satisfying: (i) the concentration C1 of the hindered amine compound 3 μm from the first film surface is higher than the concentration C2 3 μm from the second film surface; (ii) the concentration A of the plasticizer 3 μm from the first film surface is lower than the concentration B 10 μm from the first film surface; (iiia) the 15 acyl substitution degree a of the cellulose acylate 3 μm from the first film surface is lower than the acyl substitution degree b 10 μm from the first film surface; and (iiib) the 20 weight-average molecular weight Ma of the cellulose acylate 3 μm from the first film surface is higher than the weight-average molecular weight Mb 10 μm from the first film surface.

13 Claims, 1 Drawing Sheet

(51) Int. Cl.
*C08L 1/14* (2006.01)
*G02F 1/1335* (2006.01)

(56) References Cited

U.S. PATENT DOCUMENTS

| | | |
|---|---|---|
| 2008/0213512 A1 | 9/2008 | Nakamura et al. |
| 2009/0142515 A1 | 6/2009 | Nakamura et al. |

FOREIGN PATENT DOCUMENTS

| | | |
|---|---|---|
| JP | 2006-123513 A | 5/2006 |
| JP | 2006-290929 A | 10/2006 |
| JP | 2009-167416 A | 7/2009 |
| JP | 2011-116113 A | 6/2011 |
| WO | 2007/072643 A1 | 6/2007 |

OTHER PUBLICATIONS

Tachibana et al., JP 2001072782 A, English Machine Translation provided by: http://dossier1.ipdl.inpit.go.jp/AIPN/odse_top_dn.ipdl?N0000=7400.*

Murakami, JP 2005096095 A, English Machine Translation provided by: http://dossier1.ipdl.inpit.go.jp/AIPN/odse_top_dn.ipdl?N0000=7400.*

Official Action issued by the Japanese Patent Office on Feb. 17, 2015 in connection with Japanese Patent Application No. 2012-186406.

* cited by examiner

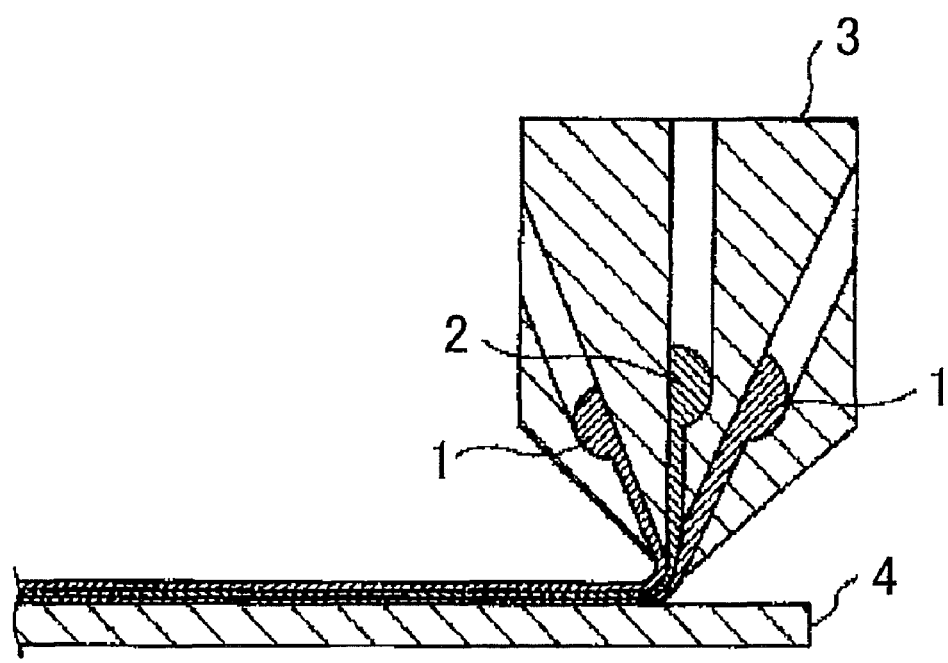

FILM, ITS PRODUCTION METHOD, AND POLARIZER AND LIQUID CRYSTAL DISPLAY DEVICE USING THE FILM

CROSS-REFERENCE TO RELATED APPLICATIONS

The present application claims the benefit of priority from Japanese Patent Application No. 2011-238232, filed on Oct. 31, 2011 and Japanese Patent Application No. 2012-186406, filed on Aug. 27, 2012, the contents of which are herein incorporated by reference in their entirety.

BACKGROUND OF THE INVENTION

1. Field of the Invention

The present invention relates to a film useful in various applications of polarizer protective films and the like, and its production method, and to a polarizer and a liquid crystal display device using the film.

2. Description of the Related Art

The surface of the viewers' side polarizer for use in display devices such as liquid crystal display devices and others is required to be given various functions of scratch resistance, antireflection, static elimination, etc. As the method for giving the functions, a general method is known, which comprises forming a functional layer such as a curable layer or the like of an active energy ray-curable composition on the surface of the protective film of a polarizer. However, the method has a problem in that the adhesiveness between the surface of the cellulose acylate film generally used as the protective film and the curable layer to be formed thereon is poor. Patent Reference 1 proposes a cellulose acylate film having solved the problem, in which the adhesiveness of the film to the functional layer such as the active energy ray-curable layer or the like has been enhanced.

Regarding liquid crystal display devices, the frequency of outdoor use thereof centering on digital signboards and others is expected to increase in future; and liquid crystal display devices capable of enduring use thereof even in severer environments than before are desired. In liquid crystal display devices, widely used is a polarizer in which the polarizing element formed of polyvinyl alcohol (PVA) and iodine is sandwiched between polarizer protective films of cellulose acylate films, etc. The polarizing element formed of PVA and iodine has a weak point in that its polarization performance may often worsen in high-temperature high-humidity environments, and for satisfying the requirements in outdoor use, the polarizing element of the type must be further improved. In addition, for outdoor use, the above-mentioned functional layers are also required to have further more enhanced durability than those for indoor use. Above all, stability to light is an especially important factor; however, the conventional functional layers have a problem in that the active energy ray-curable layer may peel away from the cellulose acylate film when exposed to light for a long period of time, and in these, therefore, even though the initial adhesiveness could be improved, the light-resistant adhesiveness could not still be improved.

As a means for enhancing the light resistance of resin films, in general, a UV absorbent and an antioxidant may be added thereto. For example, Patent Reference 2 discloses a resin film with a triazine-type UV absorbent and a hindered amine-type antioxidant added thereto. Patent Reference 3 and Patent Reference 4 disclose a cellulose acylate film containing a hindered amine-type antioxidant.

Patent Reference 1: JP-A 2011-116113
Patent Reference 2: JP-A 2009-167416
Patent Reference 3: WO07/072,643
Patent Reference 4: JP-A 2006-123513

SUMMARY OF THE INVENTION

Regarding Patent Reference 1 that discloses a cellulose acylate film of which the adhesiveness to the upper layer formed thereon has been improved, the present inventors formed a curable layer on the cellulose acylate film and investigated the adhesiveness of the film to the layer with time. As a result, the inventors have found that, when the film is exposed to light for a long period of time, the adhesiveness thereof noticeably lowers. Merely adding the hindered amine-type antioxidant described in Patent References 2 to 4 to the film could not improve the light-resistant adhesiveness of the film, and in addition, it has been known that the polarizer produced by laminating the film and a polarizing element has a problem in that, when used in high-temperature high-humidity environments for a long period of time, the polarization performance thereof would rather worsen.

The present invention has been made in consideration of the situation as above, and its one object is to provide a film of which the light-resistant adhesiveness to the curable layer formed thereon has been improved, and to provide a method for producing the film.

Another object of the invention is to provide a polarizer and a liquid crystal display device using the film, in which the light-resistant adhesiveness of the film has been improved.

Heretofore, it has been considered that the adhesiveness between an active energy ray-curable layer and a cellulose acylate film would be governed by an important factor of the affinity between the surface of the active energy ray-curable layer and the cellulose acylate film and/or the degree of crosslinking in the active energy ray-curable layer. However, as a result of assiduous investigations, the present inventors ascertained that the peeling between the active energy ray-curable layer and the cellulose acylate film may be caused by the brittle fracture of the cellulose acylate film surface layer owing to light irradiation. In addition, the inventors further ascertained that the brittle fracture is remarkably promoted by the action of the radical which is generated by photoreaction of the additive in the active energy ray-curable layer or the cellulose acylate film and which depolymerizes the resin (cellulose acylate) in the cellulose acylate film and/or the resin constituting the active energy ray-curable resin.

The method of adding a UV absorbent and an antioxidant to the cellulose acylate film as described in Patent Reference 2 is intended to inhibit the radical generation to be caused by photoabsorption by the material in the cellulose acylate film, in which the effect of preventing radical generation in the active energy ray-curable layer is low. As opposed to this, in the present invention, it is intended to inhibit not only the radical generation to be caused by photoabsorption by the material in the cellulose acylate film but also the radical generation to be caused by the active energy ray-curable layer. Specifically, the present inventors have found that, when a hindered amine compound serving as an antioxidant is added to a cellulose acylate film so as to have a concentration distribution therein, then the antioxidant (hindered amine compound) in the cellulose acylate film can be diffused into the active energy ray-curable layer formed on the film thereby effectively inactivating the active radical (peroxide radical, hydroxy radical, etc.) to be generated in the active energy ray-curable layer.

In addition, the inventors further ascertained that, when the cellulose acylate film with the hindered amine compound added thereto as in Patent References 2 to 4 is used as a polarizer protective film, then the hindered amine compound promotes the decomposition of the iodine complex in the polarizing element and, as a result, the polarization performance greatly worsens in a case of long-term use in high-temperature high-humidity environments.

Having faced the new problems, the present inventors studied them and have found that, when a hindered amine compound is eccentrically located in the vicinity of one surface of a cellulose acylate film and when the cellulose acylate film is used as a polarizer protective film in such a configuration that an active energy ray-curable layer is formed on the side of the film where the concentration of the hindered amine compound is higher and a polarizing element is attached to the side thereof where the concentration of the hindered amine compound is lower, then the adhesiveness between the active energy ray-curable layer and the cellulose acylate film can be bettered and the polarization performance worsens little in a case of long-term use in high-temperature high-humidity environments.

Specifically, the means for solving the above-mentioned problems are as follows:

[1] A film comprising a cellulose acylate, a hindered amine compound in an amount of at least 0.001% by mass relative to the cellulose acylate, and a plasticizer, and satisfying the following conditions (i), (ii), and (iiia) or (iiib):

(i) The concentration C1 of the hindered amine compound at the position of 3 μm from the first film surface in the thickness direction is higher than the concentration C2 of the hindered amine compound at the position of 3 μm from the second film surface in the thickness direction;

(ii) The concentration A of the plasticizer at the position of 3 μm from the first film surface in the thickness direction is lower than the concentration B of the plasticizer at the position of 10 μm from the first film surface in the thickness direction;

(iiia) The acyl substitution degree a of the cellulose acylate at the position of 3 μm from the first film surface in the thickness direction is lower than the acyl substitution degree b of the cellulose acylate at the position of 10 μm from the first film surface in the thickness direction;

(iiib) The weight-average molecular weight Ma of the cellulose acylate at the position of 3 μm from the first film surface in the thickness direction is higher than the weight-average molecular weight Mb of the cellulose acylate at the position of 10 μm from the first film surface in the thickness direction.

[2] The film of [1] satisfying both the conditions (iiia) and (iiib).

[3] The film of [1] or [2], comprising a core layer and a first surface layer that constitutes from the first film surface to the position to reach the core layer.

[4] The film of [3], further comprising a second surface layer that constitutes from the second film surface to the position to reach the core layer.

[5] The film of any of [1] to [4], comprising a curable layer of an active energy ray-curable composition on the first film surface.

[6] A polarizer comprising the film of any of [1] to [5] and a polarizing element.

[7] A liquid crystal display device comprising the film of any of [1] to [5].

[8] A method for producing the film of [3] or [4], which comprises cocasting a solution for first surface layer prepared by dissolving a cellulose acylate for first surface layer in one or more solvents, and a solution for core layer prepared by dissolving a cellulose acylate for core layer in one or more solvents, wherein:

the proportion c (% by mass) of the solvent acting as a good solvent for the cellulose acylate for first surface layer in all the solvents contained in the solution for first surface layer, and the proportion d (% by mass) of the solvent acting as a good solvent for the cellulose acylate for core layer in all the solvents contained in the solution for core layer satisfy the following formulae (1) and (2):

$$83 < c < 98 \quad (1)$$

$$79 < d < 83 \quad (2)$$

According to the invention, there are provided a film of which the light-resistant adhesiveness to a curable layer formed thereon has been improved, and a production method for the film.

According to the invention, there are also provided a polarizer and a liquid crystal display device using the film, in which the light-resistant adhesiveness of the film has been improved.

BRIEF DESCRIPTION OF DRAWINGS

FIG. 1 is a schematic view showing one example of a casting mode to form a three-layered cellulose acylate film according to a simultaneous co-casting method using a co-casting die. In the drawing, 1 is a dope for skin layer, 2 is a dope for core layer, 3 is a cocasting Giesser, and 4 is a casting support.

MODE FOR CARRYING OUT THE INVENTION

The cellulose acylate film and the optical film of the invention, and the method for producing the film, and the additives for use in the film are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

1. Cellulose Acylate Film

The invention relates to a film containing a cellulose acylate as the main ingredient thereof and containing a hindered amine compound in an amount of at least 0.001% by mass relative to the cellulose acylate, and a plasticizer (hereinafter the film of the invention may be referred to as "cellulose acylate film"). One characteristic feature of the cellulose acylate film of the invention is that the additives are distributed nonuniformly and not uniformly in the thickness direction of the film. Concretely, based on the two surfaces of the film, the first film surface and the second film surface, the additives are characterized by being so distributed as to satisfy the following conditions (i) and (ii):

(i) The concentration C1 of the hindered amine compound at the position of 3 μm from the first film surface in the thickness direction is higher than the concentration C2 of the hindered amine compound at the position of 3 μm from the second film surface in the thickness direction, or that is, C2<C1.

(ii) The concentration A of the plasticizer at the position of 3 μm from the first film surface in the thickness direction is lower than the concentration B of the plasticizer at the position of 10 μm from the first film surface in the thickness direction, or that is, A<B.

Satisfying the above (i) and (ii), the cellulose acylate film of the invention contains, as the main ingredient thereof, at least two types of cellulose acylates that are differentiated in point of the acyl substitution degree of the molecular point thereof, and the cellulose acylates are characterized by being so distributed as to satisfy any of the following conditions (iiia) and (iiib) or both of (iiia) and (iiib):

(iiia) The acyl substitution degree a of the cellulose acylate at the position of 3 μm from the first film surface in the thickness direction is lower than the acyl substitution degree b of the cellulose acylate at the position of 10 μm from the first film surface in the thickness direction, or that is, a<b.

(iiib) The weight-average molecular weight Ma of the cellulose acylate at the position of 3 μm from the first film surface in the thickness direction is higher than the weight-average molecular weight Mb of the cellulose acylate at the position of 10 μm from the first film surface in the thickness direction, or that is, Mb<Ma.

The cellulose acylate film satisfying the above-mentioned condition (i), in which the hindered amine compound is eccentrically located on one surface side, is improved in point of the light-resistant adhesiveness thereof to the curable layer formed thereon. Concretely, when an active energy ray-curable layer is formed on the first surface in which the concentration of the hindered amine compound is higher, then the adhesiveness between the active energy ray-curable layer and the film can be prevented from lowering even in long-term exposure to light. Further, when the cellulose acylate film of the invention is, serving as a polarizer protective film, stuck to a polarizing element in such a manner that the surface side in which the concentration of the hindered amine compound is low (that is, the second film surface side) could face the polarizing element, then the polarization performance can be prevented from worsening even in storage in high-temperature high-humidity environments.

The cellulose acylate film of the invention contains a plasticizer, of which, however, the adhesiveness to the curable layer formed thereon may be often lowered depending on the type of the plasticizer added thereto. The substitution degree and the molecular weight of the cellulose acylate have some influence on the adhesiveness of the film to the curable layer. The cellulose acylate having a lower acylation degree or having a higher molecular weight can enhance the adhesiveness thereof to the curable layer. The cellulose acylate film of the invention satisfies the condition (ii) and additionally satisfies any of the conditions (iiia) and (iiib) (but preferably both the conditions (iiia) and (iiib)), and is therefore improved not only in point of the light-resistant adhesiveness mentioned above but also in point of the initial-stage adhesiveness thereof.

The hindered amine compound concentration C1 and C2 and the plasticizer concentration A and B in the cellulose acylate film of the invention may be measured as follows: The film is cut obliquely at an angle of 1° relative to the film plane, and the formed film cross section is mapped through time-of-flight secondary ion mass spectrometry (TOF-SIMS), in which the concentration is calculated from the peak intensity ratio of the specifically-detected fragment ion peaks. The acyl substitution a and b, and the weight-average molecular weight Ma and Mb of the cellulose acylate may be measured as follows: At the position of 3 μm and at the position of 10 μm from the predetermined surface in the thickness direction thereof, a layer of the film having a thickness of 1 μm from that position is actually cut (in such a manner that the position could be the center of the thickness), and the mean acyl substitution degree of the cellulose acylate contained in the thus-cut section and the weight-average molecular weight thereof are identified.

The film in which the main ingredient cellulose acylate and the additives are distributed in the manner as above in the thickness direction thereof can be produced according to a cocasting method of using at least two dopes each having a different composition, or a method of coating one surface of a previously formed film with an additional layer, or a method of film formation in a mode of drying more one side of the film during film formation, etc.

Various materials and the method to be used in producing the film of the invention are described below.

[Cellulose Acylate]

The film of the invention contains a cellulose acylate as the main ingredient thereof. As the starting cellulose for the cellulose acylate, herein usable is any cellulose material such as wood pulp, cotton linter or the like known in Hatsumei Kyokai Disclosure Bulletin No. 2001-1745, etc. In addition, the cellulose acylate may also be produced according to the method described in Wood Chemistry, pp. 180-190 (Migita et al., by Kyoritsu Publishing, 1968), etc.

The type of the acyl group of the cellulose acylate is not specifically defined. Preferred here are those having from 2 to 4 carbon atoms. Concretely, preferred is use of an acetyl group and a propionyl group, and more preferred is an acetyl group. The cellulose acylate is preferably cellulose acetate. The acyl substitution degree of the cellulose acylate is at most 3, and preferably satisfies the above-mentioned condition (iiia). For the degree of substitution with acyl group in the invention, the data calculated according to ASTM D817 may be employed.

The weight-average molecular weight of the cellulose acylate for use in the invention preferably satisfies the above-mentioned condition (iiib), and is more preferably from 300,000 to 500,000, even more preferably from 330,000 to 400,000. When the weight-average molecular weight is less than 300,000, then the film may be brittle and would cause handling failure. The weight-average molecular weight is preferably at most 500,000 from the viewpoint of good solubility and not too high dope viscosity. The weight-average molecular weight is measured through ordinary GPC. Briefly, the film is dissolved in methylene dichloride and analyzed for the weight-average molecular weight thereof in terms of PMMA.

The film of the invention is characterized by containing at least two cellulose acylates that are differentiated in point of the acyl substitution degree or the molecular weight thereof, in which the cellulose acylates are so distributed as to satisfy any of the above-mentioned conditions (iiia) and (iiib), but preferably both the conditions (iiia) and (iiib).

The acyl substitution degree a, or that is, the acyl substitution degree of the cellulose acylate at the position of 3 μm from the first film surface in the thickness direction, and the acyl substitution degree b, or that is, the acyl substitution degree of the cellulose acylate at the position of 10 μm from the first film surface in the thickness direction preferably satisfy a<b; and more preferably, the acyl substitution degree a is from 2.3 to 2.85 and the acyl substitution degree b is from 2.80 to 3.0. From the viewpoint of the adhesiveness between the first film surface and the curable layer, the total acyl substitution degree a of the cellulose acylate in the vicinity of the first film surface is preferably from 2.3 to 2.70, more preferably from 2.35 to 2.50. In case where two or more different types of specific plasticizers including specific plasticizers (for example, the polyalcohol ester 4 mentioned below) are used as combined, the acyl substitution degree a is preferably from 2.75 to 2.85; and in such a case, the acyl substitution degree a is more preferably from 2.80 to 2.85. On the other hand, the acyl substitution degree b of the cellulose acylate existing in the center part in the thickness direction is preferably from 2.80 to 2.95 from the viewpoint of the optical performance and the moisture permeability of the film, more preferably from 2.80 to 2.90.

The weight-average molecular weight Ma, or that is, the weight-average molecular weight of the cellulose acylate at the position of 3 μm from the first film surface in the thickness direction, and the weight-average molecular weight Mb, or that is the weight-average molecular weight of the cellulose acylate at the position of 10 μm from the first film surface in the thickness direction preferably satisfy Mb<Ma. More preferably, the weight-average molecular weight Ma is from $40 \times 10^4$ to $60 \times 10^4$; and the weight-average molecular weight Mb is from $30 \times 10^4$ to $45 \times 10^4$. From the viewpoint of the adhesiveness between the first film surface and the curable layer, the weight-average molecular weight Ma of the cellulose acylate in the vicinity of the first film surface is preferably from $45 \times 10^4$ to $60 \times 10^4$, more preferably from $50 \times 10^4$ to $60 \times 10^4$. On the other hand, the weight-average molecular weight Mb of the cellulose acylate existing in the center part in the thickness direction is preferably from $35 \times 10^4$ to $45 \times 10^4$, from the viewpoint of the optical performance and the moisture permeability of the film, more preferably from $40 \times 10^4$ to $45 \times 10^4$. Also preferably, (weight-average molecular weight Ma—weight-average molecular weight Mb) is at least $3 \times 10^4$, more preferably at least $5 \times 10^4$.

The weight-average molecular weight of the cellulose acylate may be measured through gel permeation chromatography (GPC) using N-methylpyrrolidone (NMP) as the solvent.

[Hindered Amine Compound]

The cellulose acylate film of the invention contains a hindered amine compound (hereinafter this may be referred to as "HALS") in an amount of at least 0.001% by mass relative to the total mass of the cellulose acylate therein. Preferably, the film of the invention contains a hindered amine compound in an amount of from 0.001% by mass to 15% by mass on average in the entire film and relative to the total mass of the cellulose acylate therein, more preferably in an amount of from 0.01 to 10% by mass, even more preferably from 0.05 to 5% by mass. When the content of the hindered amine compound is less than 0.001% by mass relative to the cellulose acylate film, the adhesiveness between the active energy ray-curable functional layer and the cellulose acylate film could not be secured sufficiently. When the content it at most 15% by mass, then the hindered amine compound would hardly bleed out, and this is favorable from the viewpoint of improving the polarization performance of the polarizer comprising the film.

The concentration C1 of HALS, or that is, the concentration of the hindered amine compound at the position of 3 μm from the first film surface in the thickness direction, and the concentration C2 of HALS, or that is, the concentration C2 of the hindered amine compound at the position of 3 μm from the second film surface in the thickness direction each satisfy the above-mentioned condition (i). From the viewpoint of the light-resistant adhesiveness of the film, the concentration C1 of HALS in the vicinity of the first film surface is preferably higher, concretely, the concentration is preferably at least 0.5% by mass, more preferably at least 1% by mass. On the other hand, when the concentration is too high, then the plasticizer may bleed out, and therefore the upper limit is the same as that of the concentration of HALS in the entire film. From the viewpoint of preventing the polarizing element from deteriorating, the concentration C2 of HALS in the vicinity of the second film surface is preferably lower, and concretely, the concentration is preferably at most 0.5% by mass, more preferably less than 0.5% by mass, even more preferably at most 0.1% by mass. When the concentration of HALS on average in the entire film is at least 0.001% by mass, then the concentration C2 may be 0% by mass. More preferably, the ratio of concentration C1/concentration C2 is at least 2, even more preferably at least 3.

HALS functions as an antioxidant, and has a structure having a bulky organic group (for example, bulky branched alkyl group) near the N atom therein. These are known compounds, including 2,2,6,6-tetraalkylpiperidine compounds and their acid addition salts and their complexes with metal compounds, for example, as in U.S. Pat. No. 4,619,956, columns 5 to 11, and U.S. Pat. No. 4,839,405, columns 3 to 5. These compounds include those represented by the following formula (2):

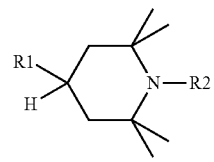

(2)

In the above-mentioned formula, R1 and R2 each represent a hydrogen atom or a substituent.

Specific examples of the hindered amine compound include 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-salicyloyloxy-2,2,6,6-tetramethylpiperidine, 4-methacryloyloxy-1,2,2,6,6-pentamethylpiperidine, 1,2,2,6,6-pentamethylpiperidin-4-yl β(3,5-di-t-butyl-4-hydroxyphenyl)-propionate, 1-benzyl-2,2,6,6-tetramethyl-4-piperidinyl maleinate, (di-2,2,6,6-tetramethylpiperidin-4-yl) adipate, (di-2,2,6,6-tetramethylpiperidin-4-yl) sebacate, (di-1,2,3,6-tetramethyl-2,6-diethyl-piperidin-4-yl) sebacate, (di-1-allyl-2,2,6,6-tetramethyl-piperidin-4-yl) phthalate, 1-acetyl-2,2,6,6-tetramethylpiperidin-4-yl acetate, tri(2,2,6,6-tetramethylpiperidin-4-yl) trimellitate, 1-acryloyl-4-benzyloxy-2,2,6,6-tetramethylpiperidine, di(1,2,2,6,6-pentamethyl-piperidin-4-yl) dibutylmalonate, di(1,2,3,6-tetramethyl-2,6-diethyl-piperidin-4-yl) dibenzylmalonate, dimethyl-bis(2,2,6,6-tetramethylpiperidin-4-oxy)-silane, tris (1-propyl-2,2,6,6-tetramethylpiperidin-4-yl) phosphite, tris (1-propyl-2,2,6,6-tetramethylpiperidin-4-yl) phosphate, N,N'-bis(2,2,6,6-tetramethylpiperidin-4-yl)hexamethylene-1,6-diamine, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, N,N'-bis(2,2,6,6-tetramethylpiperidin-4-yl)hexamethylene-1,6-diacetamide, 1-acetyl-4-(N-cyclohexylacetamide)-2,2,6,6-tetramethyl-piperdiine, 4-benzylamino-2,2,6,6-tetramethylpiperidine, N,N'-bis(2,2,6,6-tetramethylpiperidin-4-yl)-N,N'-dibutyla-dipamide, N,N'-bis(2,2,6,6-tetramethylpiperidin-4-yl)-N,N'-dicyclohexyl(2-hydroxypropylene), N,N'-bis(2,2,6,6-tetramethylpiperidin-4-yl)-p-xylylenediamine, 4-(bis(2-hydroxyethyl)-amino-1,2,2,6,6-pentamethylpiperidine, 4-methacrylamide-1,2,2,6,6-pentamethylpiperidine, methyl α-cyano-β-methyl-β-[N-(2,2,6,6-tetramethylpiperidin-4-yl)]aminoacrylate.

Further mentioned are high-molecular-weight HALSs with multiple piperidine rings bonding to each other via a triazine skeleton, such as N,N',N'',N'''-tetrakis[4,6-bis[butyl-(N-methyl-2,2,6,6-tetramethylpiperidin-4-yl)amino]triazin-2-yl]-4,7-diazadecane-1,10-diamine, a polycondensation product of dibutylamine and 1,3,5-triazine/N,N'-bis(2,2,6,6-tetramethyl-4-piperidyl)-1,6-hexamethylenediamine and N-(2,2,6,6-tetramethyl-4-piperidyl)butylamine (BASF's (formerly Ciba Specialty Chemicals') CHIMASSORB 2020FDL), a polycondensation product of dibutylamine and 1,3,5-triazine and N,N'-bis(2,2,6,6-tetramethyl-4-piperidyl)butylamine, poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}](BASF's (formerly Ciba Specialty Chemicals') CHIMASSORB 944FDL), a polycondensation product of 1,6-hexanediamine-N,N'-bis(2,2,6,6-tetramethyl-4-piperidyl) and morpholine-2,4,6-trichloro-1,3,5-triazine, poly[(6-morpholino-s-triazine-2,4-diyl) [(2,2,6,6-tetramethyl-4-piperidyl)imino]hexamethylene[(2,2,6,6-tetramethyl-4-piperidyl)imino]], etc.; high-molecular-weight HALSs with a piperidine ring bonding via an ester bond, such as a polymer of dimethyl succinate and 4-hydroxy-2,2,6,6-tetramethyl-1-piperidine-ethanol, a mixed esterification product of 1,2,3,4-butane-tetracarboxylic acid and 1,2,2,6,6-pentamethyl-4-piperidinol and 3,9-bis(2-hydroxy-1,1-dimethylethyl)-2,4,8,10-tetroxaspiro[5,5]undecane, etc., to which, however, the invention is not limited. Of the above, preferred are those having a number-average molecular weight (Mn) of from 2,000 to 5,000 of a polycondensation product of dibutylamine and 1,3,5-triazine and N,N'-bis(2,2,6,6-tetramethyl-4-piperidyl)butylamine, poly[{(1,1,3,3-tetramethylbutyl)amino-1,3,5-triazine-2,4-diyl}{2,2,6,6-tetramethyl-4-piperidyl)imino}hexamethylene{(2,2,6,6-tetramethyl-4-piperidyl)imino}], a polymer of dimethyl succinate and 4-hydroxy-2,2,6,6-tetramethyl-1-piperidine-ethanol, etc.

Examples of preferred hindered amine compounds include HALS-1 and HALS-2 mentioned below. In the following HALS-1, n means the number of recurring units.

The hindered amine compounds may be commercially-available one, or may also be produced through synthesis. The method for producing the hindered amine compounds is not specifically defined. The compounds may be produced according to any known method of organic synthesis. For the production method, employable is any mode of distillation, recrystallization, reprecipitation, and usable is any of a filtering agent and an absorbent. Of the hindered amine compounds, those inexpensively available on the market are not in the form of a single compound thereof but in the form of a mixture of multiple compounds; and any commercial products of those forms can be used here irrespective of their production method, composition, melting point, acid value, etc.

The hindered amine compounds for use in the invention may be low-molecular-weight compounds or may also be polymers having a recurring unit. Preferred are high-molecular compounds in order that the hindered amine compound could be eccentrically located in the vicinity of the interface between the active energy ray (UV)-curable resin layer and the cellulose acylate film. On the other hand, when the molecular weight of the compound is too high, then the compatibility thereof with cellulose acylate may lower and the haze of the film may therefore increase.

Preferably, the molecular weight of the hindered amine compound is from 300 to 100000, more preferably from 700 to 50000, even more preferably from 2000 to 30000.

Preferably, the hindered amine compound for use in the invention is dissolved in a ketone solvent in an amount of at least 0.01% by mass. When the hindered amine compound of the type is used in that manner, then the compound can readily dissolve in the ketone compound, which is preferably used in forming the active energy ray-curable layer to be mentioned below, and therefore can finally move to the active energy ray-curable layer formed on the film; and consequently, the embodiment of using the compound of the type is preferred here.

Preferred embodiments of the ketone solvent will be described in the section of the active energy ray-curable layer to be mentioned below.

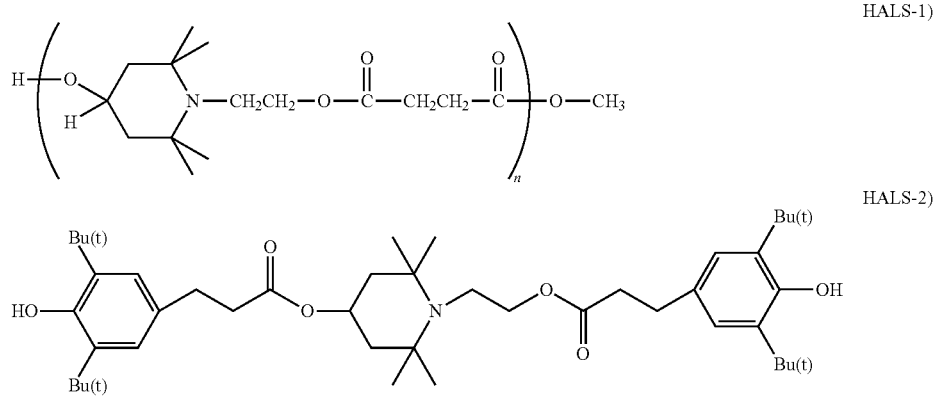

Of the above-mentioned specific examples, preferred are BASF's (formerly Ciba Specialty Chemicals') CHIMASSORB 2020FDL (CAS-No. 192268-64-7), CHIMASSORB 944FDL (CAS-No. 71878-19-8) and TINUVIN 770DF (CAS-No. 52829-07-9), and Sun Chemical's CYASORB UV-3346 (CAS-No. 82541-48-7) and CYASORB UV-3529 (CAS-No. 193098-40-7), as these are commercially available.

[Plasticizer]

The film of the invention contains at least one plasticizer. The film of the invention contains a plasticizer in an amount of from 3% by mass to 30% by mass on average in the entire film relative to the total mass of the cellulose acylate therein, more preferably in an amount of from 5 to 25% by mass and particularly preferably in an amount of from 5 to 20% by mass. When the content of the plasticizer is at least 3% by mass relative to the cellulose acylate film, then it is preferable from the viewpoint of film formation according to a solution casting method or the like; and on the other hand, when the content is at most 30% by mass, it is also preferably since a problem of bleeding out hardly occurs.

The concentration A of the plasticizer, or that is, the concentration of the plasticizer at the position of 3 µm from the first film surface in the thickness direction, and the concentration B of the plasticizer, or that is, the concentration of the plasticizer at the position of 10 µm from the first film surface in the thickness direction each satisfy the above-mentioned condition (ii). From the viewpoint of obtaining high adhesiveness irrespective of the type of the plasticizer, the concentration A of the plasticizer in the vicinity of the first film surface is preferably lower, and concretely, the concentration is preferably at most 8% by mass, more preferably at most 5% by mass, even more preferably at most 1% by mass. On the other hand, the concentration A may be 0% by mass, but from the viewpoint of film formation, the concentration is preferably at least 0.1% by mass. From the viewpoint of the optical performance and the moisture permeability of the film, the concentration B of the plasticizer in the center part in the film thickness direction is preferably from 5 to 25% by mass, more preferably from more than 5% by mass to 25% by mass, even more preferably from 5 to 15% by mass. Also preferably, (plasticizer concentration B—plasticizer concentration A) is at least 3% by mass, more preferably at least 5% by mass.

As the plasticizer in the invention, many compounds generally known as plasticizer for cellulose acylate can be used.

Examples of the plasticizer usable here include phosphates. Examples of phosphates include triphenyl phosphate (TPP), biphenyldiphenyl phosphate (BDP), and tricresyl phosphate (TCP).

Examples of the plasticizer usable in the invention include non-phosphate compounds. The non-phosphate compounds include carboxylates. The carboxylates typically include phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetylcitrate (OACTE) and tributyl O-acetylcitrate (OACTB). Examples of other carboxylates also usable here include butyl oleate, methylacetyl ricinoleate, dibutyl sebacate, and various types of trimellitates. Preferred are phthalate-type plasticizers (DMP, DEP, DBP, DOP, DPP, DEHP). More preferred are DEP and DPP.

Examples of other non-phosphate esters usable here include polyalcohols, aliphatic dibasic acid esters, acetates, polyesters, epoxy esters, ricinoleate esters, polyolefins, polyethylene glycol compounds. Preferred are polyalcohols and polyesters; and more preferred are polyesters.

As non-phosphate plasticizers, for example, polyester additives may be produced from a mixture containing an aromatic dicarboxylic acid, an aliphatic dicarboxylic acid, an aliphatic diol having a mean carbon number of from 2.0 to 3.0, and a monocarboxylic acid, and these may be polycondensation esters end-capped with acetic acid at both ends thereof. However, the invention is not limited to these.

As non-phosphate plasticizers, preferred are those having a benzene ring from the viewpoint of the optical performance and the moisture permeability of the film containing the plasticizer of the type. In the invention, a benzene ring-having plasticizer alone may be used, or a benzene ring-having plasticizer and any other plasticizer not having a benzene ring may be combined for use in the invention.

Non-phosphate plasticizers usable here are, for example, the phthalate 1, the polyalcohol esters 1 to 4 and the citrate 1 mentioned below. However, the phthalates, polyalcohol esters and citrates usable here are not limited to these.

Two or more different types of non-phosphate compounds may be used here as combined.

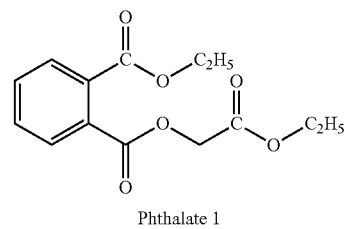

Phthalate 1

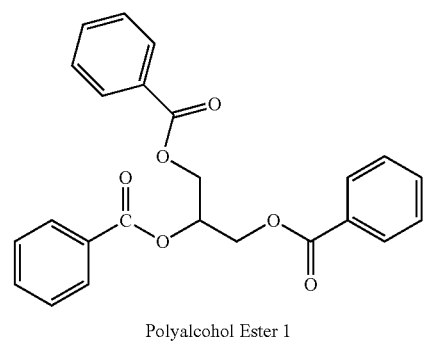

Polyalcohol Ester 1

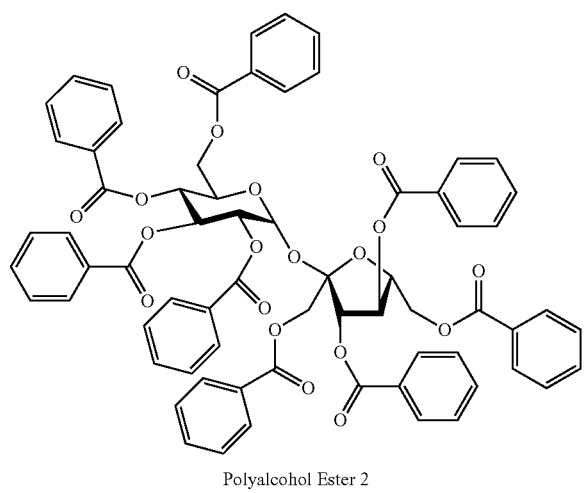

Polyalcohol Ester 2

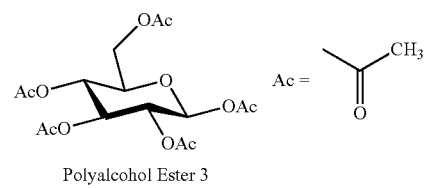

Polyalcohol Ester 3

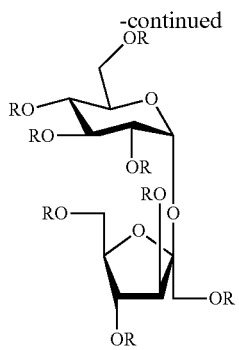

R = acetyl group (Ac) or i-butyl group (Bu)
The molar ratio of Ac to Bu in one molecule is 2/6.
Polyalcohol Ester 4

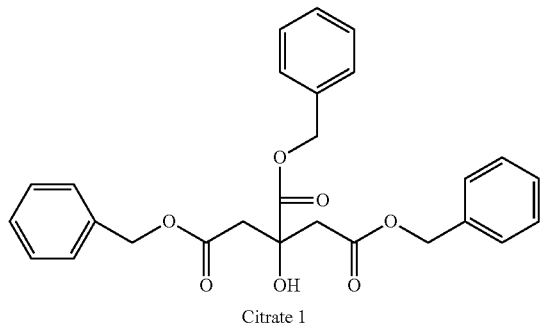 [SMILES: O=C(CC(O)(CC(=O)OCc1ccccc1)C(=O)OCc1ccccc1)OCc1ccccc1]

Citrate 1

Other examples of non-phosphate plasticizers include polycondensation polymers.

The polycondensation polymer that is used as a high-molecular-weight plasticizer in the film of the invention is a compound having a recurring unit therein, and is preferably one having a number-average molecular weight of from 700 to 10000. The high-molecular-weight additive has the function of promoting the solvent evaporation speed in a solution casting method, and the function of reducing the residual solvent amount therein. Further, the additive exhibits various useful effects from the viewpoint of improving the properties of the film, for example, improving the mechanical properties of the film, imparting softness to the film, imparting water absorption resistance thereto, reducing the moisture permeability of the film, etc.

The number-average molecular weight of the high-molecular-weight plasticizer, or that is, the polycondensation polymer for use in the invention is more preferably from 700 to 8000, even more preferably from 700 to 5000, still more preferably from 1000 to 5000.

The polycondensation polymer, or that is, the high-molecular-weight plasticizer for use in the invention is described in detail hereinunder with reference to its specific examples given below. Needless-to-say, however, the high-molecular-weight plasticizer of the polycondensation polymer for use in the invention is not limited to those mentioned below.

Preferably, the polycondensation polymer is a non-phosphate ester compound.

The high-molecular-weight plasticizer of the polycondensation polymer includes polyester polymer (aliphatic polyester polymer, aromatic polyester polymer, etc.), and copolymer of polyester ingredient and other ingredient, etc. Preferred are aliphatic polyester polymer, aromatic polyester polymer; copolymer of polyester polymer (aliphatic polyester polymer, aromatic polyester polymer, etc.) and acrylic polymer; and copolymer of polyester polymer (aliphatic polyester polymer, aromatic polyester polymer, etc.) and styrenic polymer. More preferred are polyester compounds containing an aromatic ring as at least one copolymerization ingredient.

The aliphatic polyester polymer is obtained through reaction of an aliphatic dicarboxylic acid having from 2 to 20 carbon atoms and at least one diol selected from an aliphatic diol having from 2 to 12 carbon atoms and an alkyl ether diol having from 4 to 20 carbon atoms; and both ends of the reaction product may be as such directly after the reaction, but may be endcapped through additional reaction with a monocarboxylic acid, a monoalcohol or a phenol. The endcapping is effective in point of the storability of the polymer, and is often attained for removing free carboxylic acids from the polymer. The dicarboxylic acid for use for the polyester polymer for use in the invention is preferably an aliphatic dicarboxylic acid residue having from 4 to 20 carbon atoms, or an aromatic dicarboxylic acid residue having from 8 to 20 carbon atoms.

The aliphatic dicarboxylic acid having from 2 to 20 carbon atoms includes, for example, oxalic acid, malonic acid, succinic acid, maleic acid, fumaric acid, glutaric acid, adipic acid, pimelic acid, suberic acid, azelaic acid, sebacic acid, dodecanedicarboxylic acid, and 1,4-cyclohexanedicarboxylic acid.

Of those, preferred aliphatic dicarboxylic acids are malonic acid, succinic acid, maleic acid, fumaric acid, glutaric acid, adipic acid, azelaic acid and 1,4-cyclohexanedicarboxylic acid. More preferred aliphatic dicarboxylic acids are succinic acid, glutaric acid and adipic acid.

The diol for use for the high-molecular-weight plasticizer is, for example, selected from an aliphatic diol having from 2 to 20 carbon atoms, and an alkyl ether diol having from 4 to 20 carbon atoms.

The aliphatic diol having from 2 to 20 carbon atoms includes an alkyl diol and alicyclic diol, for example, ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, etc. One or more of these glycols may be used here either singly or as combined in a mixture thereof.

Preferred diols are ethanediol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol, and 1,4-cyclohexanedimethanol; and more preferred are ethanediol, 1,2-propanediol, 1,3-propanediol, 1,2-butanediol, 1,3-butanediol, 1,4-butanediol, 1,5-pentanediol, 1,6-hexanediol, 1,4-cyclohexanediol, and 1,4-cyclohexanedimethanol.

As the alkyl ether diol having from 4 to 20 carbon atoms, preferably mentioned are polytetramethylene ether glycol, polyethylene ether glycol and polypropylene ether glycol, and their mixtures. Not specifically defined, the mean degree of polymerization of the diol is preferably from 2 to 20, more preferably from 2 to 10, even more preferably from 2 to 5, still more preferably from 2 to 4. As their examples, typically mentioned are commercially-available polyether glycols, Carbowax Resin, Pluronics Resin and Niax Resin.

In the invention, especially preferred is use of a high-molecular-weight plasticizer of which the ends are capped with an alkyl group or an aromatic group. In these, the ends are protected with a hydrophobic functional group, and therefore, the plasticizer is effective against deterioration with time in high-temperature and high-humidity environments. This is because the hydrolysis of the ester group in these is retarded.

In the invention, preferably, both ends of the polyester plasticizer are protected with a monoalcohol residue or a monocarboxylic acid residue so that the ends could not be a carboxylic acid or an OH group.

In this case, as the monoalcohol, preferred is a substituted or unsubstituted monoalcohol having from 1 to 30 carbon atoms, and there may be mentioned aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol, etc.; and substituted alcohols such as benzyl alcohol, 3-phenylpropanol, etc.

Alcohols preferred for use for endcapping include methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol; and more preferred are methanol, ethanol, propanol, isobutanol, cyclohexyl alcohol, 2-ethylhexyl alcohol, isononyl alcohol, benzyl alcohol.

In case where the ends are capped with a monocarboxylic acid residue, the monocarboxylic acid for the monocarboxylic acid residue is preferably a substituted or unsubstituted monocarboxylic acid having from 1 to 30 carbon atoms. The acid may be an aliphatic monocarboxylic acid or an aromatic ring-containing carboxylic acid. As preferred aliphatic monocarboxylic acids, there may be mentioned acetic acid, propionic acid, butanoic acid, caprylic acid, caproic acid, decanoic acid, dodecanoic acid, stearic acid, oleic acid; and as aromatic ring-containing monocarboxylic acids, for example, there may be mentioned benzoic acid, p-tert-butylbenzoic acid, p-tert-amylbenzoic acid, ortho-toluic acid, meta-toluic acid, para-toluic acid, dimethylbenzoic acid, ethylbenzoic acid, normal propylbenzoic acid, aminobenzoic acid, acetoxybenzoic acid, etc. One or more of these may be used here.

The high-molecular-weight plasticizer may be produced with ease according to ordinary methods, for example, according to a thermal melt condensation method of polyesterification reaction or interesterification reaction of the above-mentioned aliphatic dicarboxylic acid and diol and/or the monocarboxylic acid or monoalcohol for endcapping, or according to a method of interfacial condensation of a chloride of such an acid and a glycol. The polyester additives are described in detail by Koichi Murai in "Additives, Their Theory and Application" (by Miyuki Publishing, 1st edition of original version published on Mar. 1, 1973). Materials described in JP-A 05-155809, 05-155810, 05-197073, 2006-259494, 07-330670, 2006-342227, 2007-003679 are also usable herein.

The aromatic polyester polymer can be produced through copolymerization of the above-mentioned polyester polymer with an aromatic ring-having monomer. The aromatic ring-having monomer is at least one monomer selected from aromatic dicarboxylic acids having from 8 to 20 carbon atoms, and aromatic diols having from 6 to 20 carbon atoms.

The aromatic dicarboxylic acid having from 8 to 20 carbon atoms includes phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, and 2,6-naphthalenedicarboxylic acid. Of those, preferred aromatic dicarboxylic acids are phthalic acid, terephthalic acid, and isophthalic acid.

The aromatic diol having from 6 to 20 carbon atoms includes, though not specifically defined, bisphenol A, 1,2-hydroxybenzene, 1,3-hydroxybenzene, 1,4-hydroxybenzene, 1,4-benzenedimethanol. Preferred are bisphenol A, 1,4-hydroxybenzene and 1,4-benzenedimethanol.

In the invention, the aromatic polyester polymer is used preferably as a combination of the above-mentioned polyester with at least one of an aromatic dicarboxylic acid or an aromatic diol, and the combination is not specifically defined. In the invention, also preferred is use of the high-molecular-weight plasticizer endcapped with an alkyl group or an aromatic group, for the endcapping, the above-mentioned method may be used.

[Other Additives]

Any other additive may be added to the cellulose acylate film, such as a UV absorbent, an antioxidant except HALS, a retardation enhancer, a peeling promoter, a polymer additive, a mat agent, etc.

(Antioxidant)

The film of the invention may further contain any other antioxidant than HALS. Usable antioxidants that can be added to the film include phenol-type or hydroquinone-type antioxidants such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, pentaerythrityl tetrakis[3-(3,5-di-tert-butyl-4-hydroxyphenyl)propionate], etc. Further, also preferred for use herein are phosphorus-containing antioxidants such as tris(4-methoxy-3,5-diphenyl) phosphite, tris(nonylphenyl) phosphite, tris(2,4-di-tert-butylphenyl) phosphite, bis(2,6-di-tert-butyl-4-methylphenyl)pentaerythritol diphosphite, bis(2,4-di-tert-butylphenyl)pentaerythritol diphosphite, etc. Preferably, the amount of the antioxidant to be added is from 0.05 to 5.0 parts by mass relative to 100 parts by mass of the cellulose acylate in the film.

(UV Absorbent)

The film of the invention may further contain a UV absorbent from the viewpoint of preventing the degradation of polarizer, liquid crystal, etc. As the UV absorbent, preferred are those excellent in UV absorbability at a wavelength of at most 370 nm and poorly absorbing visible light having a wavelength of 400 nm or more, from the viewpoint of securing good liquid crystal display performance. Specific examples of the UV absorbent preferred for use in the invention include, for example, hindered phenolic compounds, hydroxybenzophenone compounds, benzotriazole compounds, salicylate compounds, benzophenone compounds, cyanoacrylate compounds, nickel complex compounds, etc. Examples of the hindered phenolic compounds include 2,6-di-tert-butyl-p-cresol, pentaerythrityl tetrakis[3-(3,5-di-tert-butyl-4-hydroxyphenyl) propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl) benzene, tris-(3,5-di-tert-butyl-4-hydroxybenzyl) isocyanurate, etc. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol, pentaerythrityl tetrakis[3-(3,5-di-tert-butyl-4- hydroxyphenyl)propionate], etc. The amount of the UV inhibitor to be added is preferably from 1 ppm to 1.0% by mass in the cellulose acylate film, more preferably from 10 to 1000 ppm.

[Retardation Enhancer]

For enhancing the retardation of the film of invention, a compound having at least two aromatic rings may be added to the film as a retardation enhancer.

The compound having at least two aromatic rings preferably expresses optically positive uniaxiality in uniform alignment.

The molecular weight of the compound having at least two aromatic rings is preferably from 300 to 1200, more preferably from 400 to 1000.

In case where the cellulose acylate film of the invention is used as an optical compensatory film, stretching the film is effective for controlling the optical characteristics especially Re thereof on a preferred level. For increasing Re of the film, the in-plane refractive anisotropy thereof must be increased, for which one method is stretching the film to thereby regulate the main chain alignment of the polymer film. An additive having a large refractive anisotropy may be used as an additive for increasing the refractive anisotropy of the film. For example, stretching the film could impart a force to align the polymer main chain to thereby regulate the alignability of the compound having at least two aromatic rings, and the film of the invention may be thereby readily controlled to have desired optical characteristics.

As the compound having at least two aromatic rings, for example, there may be mentioned triazine compounds described in JP-A 2003-344655, rod-shaped compounds described in JP-A 2002-363343, liquid crystal compounds described in JP-A 2005-134884, 2007-119737, etc. More preferred are the above-mentioned triazine compounds or rod-shaped compounds.

Two or more different types of compounds having at least two aromatic rings may be used here as combined.

The amount of the compound having at least two aromatic rings to be added is preferably from 0.05% to 10%, in terms of by mass relative to the cellulose acylate in the film, more preferably from 0.5% to 8%, even more preferably from 1% to 5%.

[Peeling Promoter]

The film of the invention may contain a peeling promoter which is an additive to reduce peeling resistance. Preferred peeling promoters are phosphate surfactants, carboxylic acid or carboxylate salt surfactants, sulfonic acid or sulfonate salt surfactants and sulfate ester surfactants, and these are effective in the invention. Also effective are fluorine-containing surfactants prepared by substituting a part of the hydrogen atoms bonding to the hydrocarbon chain in the above-mentioned surfactants with a fluorine atom.

The amount of the peeling promoter to be added is preferably from 0.05 to 5% by mass relative to the cellulose acylate in the film, more preferably from 0.1 to 2% by mass, most preferably from 0.1 to 0.5% by mass.

[Polymer Additive]

For the film of the invention, polymer additives mentioned below may be used. The compounds have a recurring unit, and preferably have a number-average molecular weight of from 700 to 10000. The polymer additive is used for increasing the evaporation rate of the solvent in the film or for reducing the remaining solvent amount therein in a solution casting method.

The number-average molecular weight of the polymer additive for use in the invention is preferably from 700 to less than 10000, more preferably from 800 to 8000, even more preferably from 800 to 5000, especially preferably from 1000 to 5000. Falling within the range, the polymer can be excellent in miscibility with cellulose acylate.

The polymer additive may be selected from styrenic polymers and acrylic polymers, or their copolymers; and preferred are aliphatic polyesters, aromatic polyesters, acrylic polymers and styrenic polymers.

Styrenic Polymer:

The styrenic polymer preferably contains a structural unit of an aromatic vinyl monomer represented by the following formula (I):

In the formula, $R^1$ to $R^4$ each independently represent a hydrogen atom, a halogen atom, a substituted or unsubstituted hydrocarbon group having from 1 to 30 carbon atoms and optionally having a linking group including an oxygen atom, a sulfur atom, a nitrogen atom or a silicon atom, or a polar group; $R^4$'s may be all the same atoms or groups, or may be individually different atoms or groups, or may bond to each other to form a carbon ring or a hetero ring. The carbon ring and the hetero ring may have a single-ring structure, or may be condensed with any other ring to form a multi-ring structure.

Specific examples of the aromatic vinyl monomers include styrene; alkyl-substituted styrenes such as α-methylstyrene, β-methylstyrene, p-methylstyrene, etc.; halogen-substituted styrenes such as 4-chlorostyrene, 4-bromostyrene, etc.; hydroxystyrenes such as p-hydroxystyrene, α-methyl-p-hydroxystyrene, 2-methyl-4-hydroxystyrene, 3,4-dihydroxystyrene, etc.; vinylbenzyl alcohols; alkoxy-substituted styrenes such as p-methoxystyrene, p-tert-butoxystyrene, m-tert-butoxystyrene, etc.; vinylbenzoic acids such as 3-vinylbenzoic acid, 4-vinylbenzoic acid, etc.; vinylbenzoates such as methyl 4-vinylbenzoate, ethyl 4-vinylbenzoate, etc.; 4-vinylbenzyl acetate; 4-acetoxystyrene; amidestyrenes such as 2-butylamidestyrene, 4-methylamidestyrene, p-sulfonamidestyrene, etc.; aminostyrenes such as 3-aminostyrene, 4-aminostyrene, 2-isopropenylaniline, vinylbenzyldimethylamine, etc.; nitrostyrenes such as 3-nitrostyrene, 4-nitrostyrene, etc.; cyanostyrenes such as 3-cyanostyrene, 4-cyanostyrene, etc.; vinylphenylacetonitrile; arylstyrenes such as phenylstyrene, etc.; indenes; etc. However, the invention is not limited to these specific examples. Two or more different types of these monomers may be used as copolymerization components, as combined. Of those, preferred are styrene and α-methylstyrene from the viewpoint of industrial availability and inexpensiveness.

Acrylic Polymer:

The acrylic polymer preferably contains a structural unit of an acrylate monomer represented by the following formula (II):

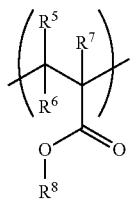

(II)

In the formula, $R^5$ to $R^8$ each independently represent a hydrogen atom, a halogen atom, a substituted or unsubstituted hydrocarbon group having from 1 to 30 carbon atoms and optionally having a linking group including an oxygen atom, a sulfur atom, a nitrogen atom or a silicon atom, or a polar group.

Examples of the acrylate monomer include, for example, methyl acrylate, ethyl acrylate, propyl (i-, n-) acrylate, butyl (n-, i-, s-, tert-) acrylate, pentyl (n-, i-, s-) acrylate, hexyl (n-, i-) acrylate, heptyl (n-, i-) acrylate, octyl (n-, i-) acrylate, nonyl (n-, i-) acrylate, myristyl (n-, i-) acrylate, (2-ethylhexyl)acrylate, (ε-caprolactone) acrylate, (2-hydroxyethyl) acrylate, (2-hydroxypropyl) acrylate, (3-hydroxypropyl) acrylate, (4-hydroxypropyl) acrylate, (2-hydroxybutyl) acrylate, (2-methoxyethyl) acrylate, (2-ethoxyethyl) acrylate, phenyl acrylate, phenyl methacrylate, (2 or 4-chlorophenyl) acrylate, (2 or 4-chlorophenyl) methacrylate, (2 or 3 or 4-ethoxycarbonylphenyl) acrylate, (2 or 3 or 4-ethoxycarbonylphenyl) methacrylate, (o or m or p-tolyl) acrylate, (o or m or p-tolyl) methacrylate, benzyl acrylate, benzyl methacrylate, phenethyl acrylate, phenethyl methacrylate, (2-naphthyl) acrylate, cyclohexyl acrylate, cyclohexyl methacrylate (4-methylcyclohexyl) acrylate, (4-methylcyclohexyl) methacrylate, (4-ethylcyclohexyl) acrylate, (4-ethylcyclohexyl) methacrylate, and methacrylates corresponding to the above-mentioned acrylates. However, the invention is not limited to these specific examples. These monomers may be used in combination of two or more kinds as copolymerizable component. Of those, preferred are methyl acrylate, ethyl acrylate, propyl (i-, n-) acrylate, butyl (n-, i-, s-, tert-) acrylate, pentyl (n-, i-, s-) acrylate, hexyl (n-, i-) acrylate and methacrylates corresponding to the above-mentioned acrylates, from the viewpoint of industrial availability and inexpensiveness.

Copolymer:

Preferably, the copolymer contains at least one structural unit derived from the aromatic vinyl monomer of the formula (I) and the acrylate monomer of the formula (II).

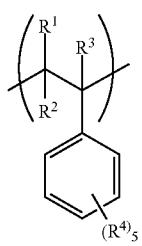

(I)

In the formula, $R^1$ to $R^4$ each independently represent a hydrogen atom, a halogen atom, a substituted or unsubstituted hydrocarbon group having from 1 to 30 carbon atoms and optionally having a linking group including an oxygen atom, a sulfur atom, a nitrogen atom or a silicon atom, or a polar group; $R^4$'s may be all the same atoms or groups, or may be individually different atoms or groups, or may bond to each other to form a carbon ring or a hetero ring. The carbon ring and the hetero ring may have a single-ring structure, or may be condensed with any other ring to form a multi-ring structure.

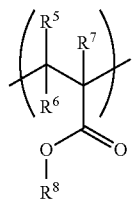

(II)

In the formula, $R^5$ to $R^8$ each independently represent a hydrogen atom, a halogen atom, a substituted or unsubstituted hydrocarbon group having from 1 to 30 carbon atoms and optionally having a linking group including an oxygen atom, a sulfur atom, a nitrogen atom or a silicon atom, or a polar group.

The other structure than the above that constitute the copolymer composition is preferably one excellent in copolymerizability with the above-mentioned monomer, and its examples include acid anhydrides such as maleic anhydride, citraconic anhydride, cis-1-cyclohexene-1,2-dicarboxylic acid anhydride, 3-methyl-cis-1-cyclohexane-1,2-dicarboxylic acid anhydride, 4-methyl-1-cyclohexene-1,2-dicarboxylic acid anhydride, etc.; nitrile group-containing radical-polymerizing monomers such as acrylonitrile, methacrylonitrile, etc.; amide bond-containing radical-polymerizing monomers such as acrylamide, methacrylamide, trifluoromethanesulfonylaminoethyl (meth)acrylate, etc.; fatty acid vinyl esters such as vinyl acetate, etc.; chlorine-containing radical-polymerizing monomers such as vinyl chloride, vinylidene chloride, etc.; conjugated diolefins such as 1,3-butadiene, isoprene 1,4-dimethylbutadiene, etc. However, the invention is not limited to these. Of those, especially preferred are styrene-acrylic acid copolymer, styrene-maleic anhydride copolymer, and styrene-acrylonitrile copolymer.

[Mat Agent]

The film of the invention may further contain a mat agent from the viewpoint of securing film slidability and securing safe production. The mat agent may be an inorganic compound mat agent or an organic compound mat agent.

Preferred examples of the inorganic compound mat agent are silicon-containing inorganic compounds (e.g., silicon dioxide, fired calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin antimony oxide, calcium carbonate, talc, clay, fired kaolin, calcium phosphate, etc. More preferred are silicon-containing inorganic compounds and zirconium oxide; and even more preferred is use of silicon dioxide as capable of reducing the haze of the cellulose acylate film. As fine particles of silicon dioxide, usable are commercially-available products of, for example, trade names of Aerosil R972, R974, R812, 200, 300, R202, OX50, TT600 (all by Nippon Aerosil), etc. As fine particles of zirconium oxide, usable are commercial products of, for example, trade names of Aerosil R976 and R811 (both by Nippon Aerosil), etc.

Preferred examples of the organic compound mat agent include, for example, polymers such as silicone resin, fluororesin, acrylic resin, etc., and more preferred is silicon resin. Of silicon resin, especially preferred are those having a three-dimensional network structure, for which, for example, usable are commercially-available products of Tospearl 103, Tospearl 105, Tospearl 108, Tospearl 120, Tospearl 145, Tospearl 3120 and Tospearl 240 (all by Toshiba Silicone), etc.

In case where the mat agent is added to the cellulose acylate solution, the method is not specifically defined, and any method capable of producing the desired cellulose acylate solution is employable with no problem. For example, the additive may be added in the stage where cellulose acylate is mixed with solvent, or the additive may be added after a mixed solution of cellulose acylate and solvent has been prepared. Further, the additive may be added and mixed just before the dope is cast, and this is a method of addition just before casting, in which a screw-type kneading mixer may be provided for on-line mixing. Concretely, a static mixer such as an in-line mixer is preferred. As the in-line mixer, for example, preferred is a static mixer, or a static-type in-line mixer High-Mixer SWJ (Toray static-type in-line mixer, Hi-Mixer) (by Toray Engineering). Regarding in-line addition, JP-A 2003-053752 describes an invention of a production method for a cellulose acylate film, in which the distance L between the tip of the supply nozzle where an additive liquid having a different composition is added to the main material dope and the starting side of the in-line mixer is controlled to be at most 5 times the inner diameter d of pipeline for the main material, whereby the density unevenness and the mat particles aggregation can be removed. The patent publication describes a more preferred embodiment of the invention where the distance (L) between the tip of the supply nozzle where an additive liquid having a different composition is added to the main material dope and the starting side of the in-line mixer is controlled to be at most 10 times the inner diameter (d) of the opening of the tip of the supply nozzle, and the in-line mixer is a static non-stirring in-line mixer or a dynamic stirring in-line mixer. More concretely, as illustrated in the patent publication, the flow rate of the cellulose acylate film main material dope/in-line additive liquid is from 10/1 to 500/1, preferably from 50/1 to 200/1. Further, JP-A 2003-014933 which provides an invention of a retardation film free from a problem of bleeding out of the additives and delamination of the constitutive layers, having good lubricity and excellent in transparency, discloses a method of adding an additive to the film. According to the method, the additive may be added to the melting tank, or the additive or a solution or dispersion of the additive may be added to the dope being fed from the melting tank to the co-casting die, and the patent publication says that, in the latter method, a static mixer or the like mixing means is preferably provided for the purpose of enhancing the mixing performance.

Unless the mat agent is added too much to the cellulose acylate film, the haze of the film does not increase; and in fact, in a case where the film is used in LCD, the mat agent added thereto does not cause any inconveniences of contrast reduction, bright spot generation, etc. On the other hand, when the amount is not too small, then the problem of film grating could be solved and the abrasion resistance of the film could be realized. From these viewpoints, preferably, the mat agent is added to the cellulose acylate film in a ratio of from 0.01 to 5.0% by weight, more preferably from 0.03 to 3.0% by weight, even more preferably from 0.05 to 1.0% by weight.

[Layer Configuration of Film]

The cellulose acylate film may be a single layer or a laminate of two or more layers.

In case where the cellulose acylate film is a two-layer or more multi-layer laminate, preferably, the laminate comprises a core layer and at least one surface layer laminated on at least one surface of the core layer. More preferably, the laminate is a two-layer laminate or a three-layer laminate, even more preferably a three-layer laminate. Preferably, the three-layer laminate has a layer that is kept in contact with the metal support in producing the film according to a solution casting method (hereinafter this may be referred to as a support-side layer, a support-side surface layer or a skin B layer), and an air interface layer opposite to the metal support (hereinafter this may be referred to as an air-side surface layer or a surface A layer), and one core layer sandwiched between them. Specifically, the film of the invention preferably has a three-layer configuration of surface B layer/core layer/surface A layer.

[Production Method for Cellulose Acylate Film]

The film of the invention can be produced according to various methods. The film can be produced according to any of a solution casting method or a melt casting method, but preferred is a solution casting method. The film having the above-mentioned laminate configuration can be produced, for example, according to a cocasting method of using dopes each having a different composition. By controlling the acyl substitution degree and/or the weight-average molecular weight of the main ingredient cellulose acylate to be contained in the dope for forming the core layer and the surface layer, as well as the amount of HALS and that of the plasticizer also to be contained therein, and also by controlling the casting amount to thereby control the thickness of the layer, the film of the invention that satisfies the above-mentioned conditions (i), (ii) and (iiia), or the above-mentioned conditions (i), (ii) and (iiib) can be produced.

One example of the film to be produced according to the cocasting method is a film having at least a first surface layer that constitutes from the first film surface to the position of d1 µm in the thickness direction, and a core layer adjacent to the first surface layer; and another example is a film having a first surface layer that constitutes from the first film surface to the position of d1 µm in the thickness direction, a core layer adjacent to the first surface layer, and a second surface layer that constitutes from the second film surface to the position of d2 µm and is adjacent to the core layer.

Preferably, the thickness d1 and d2 of the first and second surface layers is from 1 µm to 15 µm, more preferably from 1 µm to 10 µm, even more preferably from 2 µm to 7 µm. Preferably, the thickness of the core layer is from 20 µm to 150 µm, more preferably from 20 µm to 80 µm, even more preferably from 20 µm to 60 µm. Also preferably, the thickness of the surface layer is from 1 to 50% of the total film thickness, more preferably from 2 to 30%. In case of cocasting to form a three-layer or more multilayer film, the total film thickness of the layer having been kept in contact with the metal support and the air-side layer is defined as the outer thickness of the film.

The cocasting method is a type of solution casting method, and in the solution casting method, a solution (dope) prepared by dissolving the main ingredient cellulose acylate in an organic solvent is cast into a film.

Preferably, the organic solvent contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms. These ethers, ketones and esters may have a cyclic structure. Compounds having at least any two of functional groups of ether, ketone and ester (that is, —O—, —CO— and —COO—) may also be used as the organic solvent. The organic solvent may have any other functional group such as an alcoholic hydroxyl group. In case where the organic solvent has two or more different functional groups, the carbon number thereof may fall within the range defined for the compound having any of those functional groups.

Relative to all the solvents to be contained in the solution (dope) of cellulose acylate in solution casting, the proportion of the solvent that acts as a good solvent for the cellulose acylate is preferably from 79 to 95% by mass, more preferably from 82 to 94% by mass, most preferably from 87 to 92% by mass.

Regarding the proportion of the good solvent in the dope, when the proportion of the good solvent is larger, then the adhesiveness between the cellulose acylate film and the hard coat layer formed thereon may be better. This is because, in case where the dope is cast onto a glass plate or onto a drum or a band, the dope is preferably gelled, and in such a case, when the proportion of the good solvent is too high, then the cellulose acylate could hardly be gelled.

In case where the dope is cast onto a cooled drum, a poor solvent for gelling the dope is needed in a predetermined ratio, and preferably, the ratio of the good solvent in the case is from 79% by mass to less than 87% by mass, more preferably from 79% by mass to less than 85% mass, most preferably from 79% by mass to less than 83% by mass.

In case where a dope for core layer and a dope for surface layer are cocast, the ratio of the good solvent in the dope for core layer is preferably from 79% by mass to less than 87% by mass, more preferably from 79% by mass to less than 85% mass, most preferably from 79% by mass to less than 83% by mass. The ratio of the good solvent in the dope for surface layer is preferably from 83% by mass to less than 95% by mass, more preferably from 85% by mass to less than 95% mass, most preferably from 87% by mass to less than 92% by mass.

One example of producing the film of the invention by cocasting is as follows:

The method for producing the film comprises a step of cocasting a solution for first surface layer prepared by dissolving a cellulose acylate for first surface layer in one or more solvents, and a solution for core layer prepared by dissolving a cellulose acylate for core layer in one or more solvents, wherein:

the proportion c (% by mass) of the solvent acting as a good solvent for the cellulose acylate for first surface layer in all the solvents contained in the solution for first surface layer, and the proportion d (% by mass) of the solvent acting as a good solvent for the cellulose acylate for core layer in all the solvents contained in the solution for core layer satisfy the following formulae (1) and (2):

$$83<c<98 \quad (1)$$

$$79<d<83 \quad (2)$$

One example of the production method for the embodiment further having a second surface layer is as follows:

The method for producing the film comprises a step of cocasting a solution for first surface layer prepared by dissolving a cellulose acylate for first surface layer in one or more solvents, a solution for core layer prepared by dissolving a cellulose acylate for core layer in one or more solvents, and a solution for second surface layer prepared by dissolving a cellulose acylate for second surface layer in one or more solvents, wherein:

the proportion c (% by mass) of the solvent acting as a good solvent for the cellulose acylate for first and second surface layers in all the solvents contained in the solution for first and second surface layers, and the proportion d (% by mass) of the solvent acting as a good solvent for the cellulose acylate for core layer in all the solvents contained in the solution for core layer satisfy the following formulae (1) and (2):

$$83<c<98 \quad (1)$$

$$79<d<83 \quad (2)$$

The above c is more preferably $85 \leq c<95$, even more preferably $87 \leq c<92$.

This is because when the above mentioned formulae (1) and (2) are satisfied, then the dope to be a core layer is gelled after cast on a cooled drum and can be peeled away, and since the ratio of the good solvent in the surface layer is high, the adhesiveness between the cellulose acylate film and the hard coat layer formed thereon may be thereby bettered.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetol.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl formate, methyl acetate, ethyl acetate and pentyl acetate.

Examples of the organic solvents having at least two functional groups include 2-ethoxyethyl acetate, 2-methoxyethanol and 3-butoxyethanol.

Preferably, the carbon number of the halogenohydrocarbons is 1 or 2, most preferably 1. The halogen in the halogenohydrocarbons is preferably chlorine. The proportion of substitution with halogen of the hydrogen atoms in the halogenohydrocarbon is preferably from 25 to 75 mol %, more preferably 30 to 70 mol %, further preferably from 35 to 65%, most preferably from 40 to 60%. Methylene chloride (dichloromethane) is one typical example of the halogenohydrocarbon.

Two or more different types of organic solvents may be mixed for use herein.

The good solvent for cellulose acylate means a solvent in which a cellulose acylate can dissolve in a percent concentration by mass of at least 10% by mass at room temperature (20° C.), including, for example, methylene chloride, chloroform, acetone, methyl acetate, etc. The poor solvent means a solvent in which a cellulose acylate can dissolve only in a percent concentration by mass of less than 10% by mass at room temperature, including, for example, methanol, ethanol, butanol.

The cellulose acylate solution can be prepared according to any ordinary method. The ordinary method includes a treatment at a temperature not lower than 0° C. (room temperature or high temperature). The solution can be prepared by the use of a dope preparation method and apparatus for an ordinary solvent casting method. In the ordinary method, preferably a halogenohydrocarbon (especially methylene chloride) is used as the organic solvent.

The amount of the cellulose acylate is so controlled that it could be contained in the resulting solution in an amount of from 10 to 40% by mass. More preferably, the amount of the cellulose acylate is from 10 to 30% by mass. Any optical solvent such as those mentioned above may be previously added to the organic solvent (main solvent).

The solution may be prepared by stirring a cellulose acylate and an organic solvent at an ordinary temperature (0 to 40° C.). A high-concentration solution may be stirred under pressure and under heat. Concretely, a cellulose acylate and an organic solvent are put into a pressure reactor and sealed up therein, and stirred under pressure at a temperature not lower than the boiling point at room temperature of the solvent but not higher than the temperature at which the solvent boils. The heating temperature is generally 40° C. or higher, preferably from 60 to 200° C., more preferably from 80 to 110° C.

The ingredients may be put into the reactor after previously roughly mixed. They may be put into the reactor one after another. The reactor must be so designed that the contents therein could be stirred. An inert gas such as nitrogen gas or the like may be injected into the reactor for pressurization. The increase in the vapor pressure of the solvent by heating may be utilized. As the case may be, after the reactor has been closed, the ingredients may be added thereto under pressure.

In heating, preferably, the ingredients are heated from the outside. For example, a jacket-type heating unit may be sued. A plate heater may be arranged outside the reactor, and a liquid may be circulated through the piping arranged therein to heat the entire reactor.

Preferably, a stirring blade is arranged inside the reactor and the contents are stirred with it. Preferably, the stirring blade has a length to reach near the inner wall of the reactor. Preferably, the end of the stirring blade is provided with a scraper for renewing the liquid film on the inner wall of the reactor.

The reactor may be equipped with instruments such as a pressure gauge, a thermometer, etc. The ingredients are dissolved in a solvent in the reactor. The prepared dope is taken out of the reactor after cooled, or after taken out, it is cooled with a heat exchanger or the like.

From the prepared cellulose acylate solution (dope), the cellulose acylate film can be produced according to a solvent casting method.

The dope is cast onto a drum or band, and the solvent is evaporated away to form a film. Preferably, the concentration of the dope to be cast is so controlled that the solid content therein could be from 18 to 35% by mass. Preferably, the surface of the drum or band is mirror-finished. The casting and drying method according to a solvent casting method is described in U.S. Pat. Nos. 2,336,310, 2,367,603, 2,492,078, 2,492,977, 2,492,978, 2,607,704, 2,739,069, 2,739,070; British Patent 640731, 736892; JP-B 45-4554, 49-5614; JP-A 60-176834, 60-203430, 62-115035.

In the embodiment of producing the film of the invention according to cocasting, preferably, the solutions for the first layer and the core layer differ in point of the substitution degree of the cellulose acylate to constitute the main ingredient therein. Concretely, a cellulose acylate having an acyl substitution degree a, preferably an acyl substitution degree of from 2.3 to 2.85 is used for the first surface layer and a dope for the first surface layer is prepared by the use of the cellulose acylate of the type, and a cellulose acylate having an acyl substitution degree b (a<b), preferably an acyl substitution degree of from 2.80 to 3.0 is used for the core layer and a dope for the core layer is prepared by the use of the cellulose acylate of the type; and/or a cellulose acylate having a weight-average molecular weight Ma, preferably a weight-average molecular weight of from $40 \times 10^4$ to $60 \times 10^4$ is used for the first surface layer and a dope for the first surface layer is prepared by the use of the cellulose acylate of the type, and a cellulose acylate having a weight-average molecular weight Mb (Mb<Ma), preferably a weight-average molecular weight of from $30 \times 10^4$ to $45 \times 10^4$ is used for the core layer and a dope for the core layer is prepared by the use of the cellulose acylate of the type.

In the embodiment having a second surface layer, the cellulose acylate for second surface layer is not specifically defined, for which the same cellulose acylate as the cellulose acylate for first surface layer may be used, or the same cellulose acylate as the cellulose acylate for core layer may be used, or a cellulose acylate differing from any of those cellulose acylates in point of the acyl substitution degree and/or the weight-average molecular weight may also be used.

In the embodiment of producing the film of the invention by cocasting, the solution for first surface layer may differ from the solution for core layer or second surface layer in point of the HALS concentration therein. Concretely, the HALS concentration in the dope for first surface layer may be the same as the above-mentioned concentration C1, preferably, the HALS concentration is at least 0.5% by mass (more preferably from 0.5 to 15% by mass), and the HALS concentration in the dope for core layer or second surface layer may be the same as the above-mentioned concentration C2 (C2<C1), preferably the HALS concentration is at most 0.5% by mass (more preferably from 0% by mass to less than 0.5% by mass).

In the embodiment of producing the film of the invention by cocasting, the solution for first surface layer may differ from the solution for core layer in point of the plasticizer concentration therein. Concretely, the plasticizer concentration in the dope for first surface layer may be the same as the above-mentioned concentration A, preferably, the plasticizer concentration is at most 5% by mass (more preferably from 0.1 to 5% by mass), and the plasticizer concentration in the dope for core layer may be the same as the above-mentioned concentration B (A<B), concretely, the plasticizer concentration is at least 5% by mass (more preferably from more than 5% by mass to 25% by mass). In the embodiment of having a second surface layer, the plasticizer concentration in the cellulose acylate solution for second surface layer is preferably lower from the viewpoint of the peelability of the film, and for example, the plasticizer concentration is preferably on the same level as that of the plasticizer concentration in the dope for first surface layer.

The solution casting method includes a method of uniformly extruding a prepared dope onto a metal support through a pressure die, a method of controlling the thickness of the dope having been once cast on a metal support, by the use of a doctor blade, a method of controlling the thickness by the sue of a reverse roll coater that rotates in the reverse direction, etc. Preferred is the method of using a pressure die. The pressure die includes a coat hanger-type pressure die, a T-die-type pressure die, etc., any of which is preferred for use herein. Apart from the methods mentioned here, any other various methods heretofore known in the art for casting film formation with a cellulose triacetate solution are employable here. In consideration of the difference in the boiling point and others between the solvents to be used, the conditions for the method to be employed here may be suitably determined thereby attaining the same effects as those described in the patent publications.

For forming the cellulose acylate film, preferably employed here are lamination casting methods such as a cocasting method, a sequential casting method, a coating method, etc. Especially preferred is a simultaneous cocasting method from the viewpoint of stable production and production cost reduction.

In case where the film is produced according to a cocasting method and a sequential casting method, first the cellulose acetate solutions (dopes) for the constitutive layers are prepared. In the cocasting method (multilayer simultaneous casting method), cocasting dopes are simultaneously extruded out through a casting Giesser through which the individual casting dopes for the intended layers (the number of the layers may be three or more) are simultaneously cast via different slits onto a casting support (band or drum), and at a suitable time, the film formed on the support is peeled away and dried.

FIG. 1 is a cross-sectional view showing a mode of simultaneous extrusion to form three layers by casting the dope 1 for skin layer (surface layer) and the dope 2 for core layer on a casting support 4 through a co-casting Giesser 3.

The sequential casting method is as follows: First the casting dope for first layer is extruded out and cast onto a casting support through a casting Giesser, then after it is dried or not dried, the casting dope for second layer is cast onto it in a mode of extrusion through a casting Giesser, and if desired, three or more layers are sequentially formed in the same mode of casting and lamination, and at a suitable time, the resulting laminate film is peeled away from the support and dried. One general coating method is as follows: A film of a core layer is formed according to a solution casting method, then a coating solution for skin layer is prepared, and using a suitable coater, the coating solution is applied onto the previously formed core film first on one surface thereof and next on the other surface thereof, or simultaneously on both surfaces thereof, and the resulting laminate film is dried.

As the endlessly running metal support for use in producing the cellulose acylate film, usable is a drum of which the surface is mirror-finished by chromium plating, or a stainless belt (band) of which the surface is mirror-finished by polishing. One or more pressure dies may be arranged above the metal support. Preferably, one or two pressure dies are arranged. In case where two or more pressure dies are arranged, the dope to be cast may be divided into portions suitable for the individual dies; or the dope may be fed to the die at a suitable proportion via a plurality of precision metering gear pumps. The temperature of the dope (resin solution) to be cast is preferably from −10 to 55° C., more preferably from 25 to 50° C. In this case, the solution temperature may be the same throughout the entire process, or may differ in different sites of the process. In case where the temperature differs in different sites, the dope shall have the desired temperature just before cast.

The material of the metal support is not specifically defined. Preferably, the metal support is formed of SUS (for example, SUS 316).

After formed, the film may be stretched. The stretching treatment makes it possible to control the optical performance of the film to fall within a desired range. The stretching direction of the cellulose acylate film may be preferably any of the film conveying direction or the direction perpendicular to the film conveying direction (cross direction). More preferably, the film is stretched in the direction perpendicular to the film conveying direction (cross direction) from the viewpoint of the subsequent process of using the film for producing polarizers.

The method of stretching in the cross direction is described, for example, in JP-A 62-115035, 4-152125, 4-284211, 4-298310, 11-48271, etc. For the machine-direction stretching, for example, the speed of the film conveyor rollers is regulated so that the film winding speed could be higher than the film peeling speed whereby the film may be stretched. For the cross-direction stretching, the film is conveyed while held by a tenter on the sides thereof and the tenter width is gradually broadened, whereby the film can be stretched. After dried, the film may be stretched with a stretcher (preferably for monoaxial stretching with a long stretcher).

The draw ratio in stretching of the cellulose acylate film is preferably from 5% to 200%, more preferably from 10% to 100%, even more preferably from 20% to 50%.

In case where the cellulose acylate film is used as a protective film for a polarizing element, the transmission axis of the polarizing element must be in parallel to the in-plane slow axis of the film of the invention so as to prevent the light leakage in oblique directions to the polarizer. The transmission axis of the roll film-type polarizing element that is produced continuously is generally parallel to the cross direction of the roll film, and therefore, in continuously sticking the roll film-type polarizing element and a protective film comprising the roll film-type cellulose acylate film, the in-plane slow axis of the roll film-type protective film must be parallel to the cross direction of the film. Accordingly, the film is preferably stretched to a larger extent in the cross direction. The stretching treatment may be attained during the course of the film formation process, or the wound film may be unwound and stretched. In the production method of the invention, the film is stretched while it contains the residual solvent therein, and therefore the film is preferably stretched during the course of the film formation process.

Preferably, the production method for the cellulose acylate film includes a step of drying the cellulose acylate film and a step of stretching the dried film at a temperature not lower than (Tg-10° C.), from the viewpoint of enhancing the retardation of the film.

For drying the dope on the metal support in production of the cellulose acylate film, generally employable is a method of applying hot air to the surface of the metal support (drum or belt), or that is, onto the surface of the web on the metal support; a method of applying hot air to the back of the drum or belt; or a back side liquid heat transfer method that comprises contacting a temperature-controlled liquid with the opposite side of the dope-cast surface of the belt or drum, or that is, the back of the belt or drum to thereby heat the belt or drum by heat transmission to control the surface temperature thereof. Preferred is the backside liquid heat transfer method. The surface temperature of the metal support before the dope is cast thereon may be any degree so far as it is not higher than the boiling point of the solvent used in the dope. However, for promoting the drying or for making the dope lose its flowability on the metal support, preferably, the temperature is set to be lower by from 1 to 10° C. than the boiling point of the solvent having the lowest boiling point of all the solvents in the dope. In case where the cast dope is peeled off after cooled but not dried, then this shall not apply thereto.

Formed on the metal support, the method of peeling the dope film from the metal support is not specifically defined. Any known method is employable here enhancing the peelability of the film.

For controlling the thickness of the film, the solid concentration in the dope, the slit gap of the die nozzle, the extrusion pressure from the die, and the metal support speed may be suitably regulated so that the formed film could have a desired thickness.

[Thickness of Film]

The total thickness of the cellulose acylate film thus obtained in the manner as above is preferably from 30 to 100 μm, more preferably from 30 to 80 μm, even more preferably from 30 to 70 μm. When the thickness is at least 30 μm, the handleability of the web like film in its production is bettered. When the thickness is at most 70 μm, the film can well follow humidity change and can readily maintain the optical characteristics thereof.

[Length of Film]

Produced in the manner as above, the length of the cellulose acylate film is preferably from 100 to 10000 m per roll, more preferably from 500 to 7000 m, even more preferably from 1000 to 6000 m. In winding the film, preferably, at least one side thereof is knurled, and the knurling width is preferably from 3 mm to 50 mm, more preferably from 5 mm to 30 mm, and the knurling height is preferably from 0.5 to 500 μm, more preferably from 1 to 200 μm. This may be one-way or double-way knurling.

In case where the film of the invention is used as an optical compensatory film for large-panel liquid crystal display devices, for example, the film is shaped to have a width of at least 1470 mm. The cellulose acylate film and the optical film of the invention include not only film sheets cut to have a size that may be directly incorporated in liquid crystal display devices but also long films continuously produced and rolled up into rolls. The optical film of the latter embodiment is stored and transported in the rolled form as a polarizer protective film, and is cut into a desired size when it is actually incorporated into a liquid crystal display device or when it is stuck to a polarizing element or the like. The long film may be stuck to a polarizing element formed of a long polyvinyl alcohol film directly as they are in the form of long films, and then when this is actually incorporated into a liquid crystal display device, it may be cut into a desired size. One embodiment of the cellulose acylate film and the optical film as rolled up into a roll may have a length of 2500 m/roll or more.

[Width of Film]

Preferably, the cellulose acylate film has a width of from 700 to 3000 mm, more preferably from 1000 to 2800 mm, even more preferably from 1400 to 2500 mm.

[Haze of Film]

Preferably, the haze of the cellulose acylate film is less than 0.20%, more preferably less than 0.15%, even more preferably less than 0.10%. When the haze is less than 0.2%, the film can improve the contrast ratio of the liquid crystal display device that comprises the film. Another advantage of the film is that the transparency thereof can be higher and therefore the film can be more readily used for optical films.

2. Active Energy Ray-Curable Layer

The film of the invention may have a curable layer of an active energy ray-curable composition on the surface thereof. Preferably, the curable layer is formed on the first surface of which the adhesiveness and the light-resistant adhesiveness to the curable layer has been enhanced. The active energy ray-curable composition means a composition containing a resin that cures through exposure to active energy rays and having the property of being cured with active energy rays, and the layer formed by curing the composition with active energy rays is the active energy ray-curable layer.

The active energy ray-curable layer may contain the above-mentioned hindered amine compound, or may not contain it. For example, even though HALS is not directly added to the active energy ray-curable composition, HALS having been added to the cellulose acylate film could move to the active energy ray-curable layer so that HALS could exist in the curable layer.

Preferably, HALS is contained in the active energy ray-curable layer in an amount of from 0.001 to 1% by mass relative to the main ingredient therein, more preferably from 0.005 to 0.5% by mass, even more preferably from 0.01 to 0.1% by mass.

The active energy ray-curable layer preferably has the functions of front scattering, antiglaring, gas barrier, lubrication, static charge prevention, undercoating, hard coat, antireflection, protection, etc. Specifically, the active energy ray-curable layer is preferably a functional layer such as a front scattering layer, an antiglare layer, a gas barrier layer, a lubricant layer, an antistatic layer, an undercoat layer, a hard coat layer, an antireflection layer, a protective layer or the like. More preferably, the active energy ray-curable layer is an antireflection layer or a hard coat layer, even more preferably a hard coat layer. Also preferably, the above functional layer is used in one and the same layer as mutually complexed therein with the antireflection layer in the other antireflection film than the active energy ray-curable layer, or with the optically anisotropic layer or the like in the other viewing angle compensatory film, etc. The film of the invention may have one alone or two or more of such active energy ray-curable layers. In this, the multiple active energy curable-layers, if any, may be the same or different.

(1) Hard Coat Layer

For enhancing the mechanical strength such as the abrasion resistance of the film of the invention, the film may have a hard coat layer as the active energy ray-curable layer.

Preferably, the thickness of the hard coat layer is from 0.2 to 100 μm, more preferably from 0.5 to 50 μm, even more preferably from 1 to 20 μm.

Preferably, the strength of the hard coat layer is on the level of H or more in the pencil hardness test according to JIS K5400, more preferably 2H or more, most preferably 3H or more. Also preferably, the depth of wear of the test piece of the film before and after the Taber abrasion test according to JIS K5400 is smaller.

For the material of forming the hard coat layer, usable are a compound containing an ethylenic unsaturated group and a compound containing a ring-opening polymerizing group; and these compounds may be used singly or as combined.

Preferred examples of the compound having an ethylenic unsaturated group include polyol polyacrylates such as ethylene glycol acrylate, trimethylolpropane triacrylate, ditrimethylolpropane tetracrylate, pentaerythritol triacrylate, pentaerythritol tetracrylate, dipentaerythritol pentacrylate, dipentaerythritol hexacrylate, etc.; epoxy acrylates such as bisphenol A diglycidyl ether diacrylate, hexanediol diglycidyl ether diacrylate, etc.; urethane acrylates to be obtained through reaction with a hydroxyl group-containing acrylate, such as polyisocyanate and hydroxyethyl acrylate, etc.

Commercial products of the compound having an ethylenic unsaturated compound are available, including PET-30 (by Nippon Kayaku), Biscoat 360 (by Osaka Organic Chemical Industry), EB-600, EB-40, EB-140, EB-1150, EB-1290K, IRR214, EB-2220, TMPTA, TMPTMA (all by Daicel YCB), UV-6300, UV-1700B (both by Nippon Gohsei), etc.

Preferred examples of the compound containing a ring-opening polymerizing group include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl-isocyanurate, sorbitol tetraglycidyl ether, pentaerythritol tetraglycidyl ether, cresol-novolak resin polyglycidyl ether, phenol-novolak resin polyglycidyl ether, etc.; alicyclic epoxy compounds such as Celloxide2021P, Celloxide 2081, EpoleadGT-301, EpoleadGT-401, EHPE 3150CE (all by Daicel Chemical Industry), phenol-novolak resin polycyclohexyl epoxymethyl ether, etc.; oxetanes such as OXT-121, OXT-221, OX-SQ, PNOX-1009 (all by To a Gohsei), etc. In addition, a glycidyl (meth)acrylate polymer, or a copolymer of glycidyl (meth)acrylate and a comonomer is also usable for the hard coat layer.

Preferably, oxide fine particles with silicon, titanium, zirconium, aluminium or the like, as well as crosslinked fine particles of polyethylene, polystyrene, poly(meth)acrylate, polydimethylsiloxane or the like, crosslinked rubber fine particles of SBR, NBR or the like, or other crosslinked organic fine particles may be added to the hard coat layer for the purpose of reducing the curing shrinkage of the layer, enhancing the adhesiveness of the layer with substrate, imparting optical diffusibility to the layer and preventing the hard coat-treated products of the invention from curling. Preferably, the mean particle size of the crosslinked fine particles is from 1 nm to 20000 nm. The shape of the crosslinked fine particles is not specifically defined, and any of spherical, rod-like, needle-like or tabular fine particles are usable here with no limitation. Preferably, the amount of the fine particles to be added is at most 60% by volume of the cured hard coat layer, more preferably at most 40% by volume.

In general, the affinity for binder polymer of inorganic fine particles is low, and therefore when inorganic fine particles are used here, they are preferably surface-treated with a surface-treating agent containing a metal such as silicon, aluminium, titanium or the like and having a functional group such as an alkoxides, a carboxylic acid group, a sulfonic acid group, a phosphonic acid group or the like.

Preferably, the hard coat layer is formed through crosslinking reaction or polymerization reaction of a curable compound with light and/or under heat. The curable functional group is preferably a photopolymerizing functional group.

An organic metal compound containing a hydrolysable functional group may also be used here. The organic metal compound containing a hydrolysable functional group is preferably an organic alkoxysilyl compound.

In addition, a polymerization initiator and a leveling agent may be added to the hard coat layer, for which any known compounds are employable here.

Regarding the concrete constitutive composition for the hard coat layer, for example, preferably used are those described in JP-A 2002-144913, 2000-9908, WO00/46617, etc.

(2) Antireflection Layer

The film of the invention may have an antireflection layer as the active energy ray-curable layer.

The antireflection layer may be any of a single layer of a low-refractivity material such as a fluoropolymer or the like having a reflectivity of 1.5% or so, or a layer utilizing multi-layer interference of thin films and having a reflectivity of at most 1%. In the invention, preferred is use of a configuration produced by laminating a low-refractivity layer and at least one layer having a higher refractivity than that of the low-refractivity layer (that is, a high-refractivity layer, a middle-refractivity layer) on a transparent support. In addition, also preferred for use herein are the antireflection layers described in Nitto Technical Report, Vol. 38, No. 1, May 2000, pp. 26-28, and in JP-A 2002-301783.

The layers satisfy the following relationship in point of the refractivity thereof.

Refractive index of high-refractivity layer >refractive index of middle-refractivity layer >refractive index of transparent support >refractive index of low-refractivity layer As the transparent support for use in the antireflection film, preferably used is the same transparent polymer film as that to be used for the protective film for polarizing element mentioned above.

Preferably, the refractive index of the low-refractivity layer is from 1.20 to 1.55, more preferably from 1.30 to 1.50. Preferably, the low-refractivity layer is used as the outermost layer having abrasion resistance and fouling resistance. For enhancing the abrasion resistance of the layer, preferably used is a material containing a silicone group or fluorine to thereby impart lubricity to the surface of the layer.

As the fluorine-containing compound, for example, preferably used here are the compounds described in JP-A 9-222503, [0018] to [0026], JP-A 11-38202, [0019] to [0030], JP-A 2001-40284, [0027] to [0028], JP-A 2000-284102, etc.

As the silicone-containing compound, preferred are compounds having a polysiloxane structure; however, reactive silicones (for example, Silaplane by Chisso, and polysiloxane having a silanol group at both ends thereof (JP-A 11-258403)) and the like are also usable here. An organic metal compound such as a silane coupling agent and a specific, fluorohydrocarbon group-containing silane coupling agent may be cured through condensation in the presence of a catalyst (compounds described in JP-A 58-142958, 58-147483, 58-147484, 9-157582, 11-106704, 2000-117902, 2001-48590, 2002-53804, etc.).

Preferably, the low-refractivity layer may contain, as other additives than the above added thereto, a filler (for example, low-refractivity inorganic compounds having a primary particle size of from 1 to 150 nm, such as silicon dioxide (silica), fluorine-containing particles (magnesium fluoride, calcium fluoride, barium fluoride), etc.; organic fine particles described in JP-A 11-3820, [0020] to [0038], etc.), a silane coupling agent, a lubricant, a surfactant, etc.

The low-refractivity layer may be formed according to a vapor phase method (vacuum evaporation method, sputtering method, ion plating method, plasma CVD method, etc.); however, the layer is preferably formed according to a coating method as inexpensive. As the coating method, preferred are a dip coating method, an air knife coating method, a curtain coating method, a roller coating method, a wire bar coating method, a gravure coating method, a microgravure coating method.

Preferably, the thickness of the low-refractivity layer is from 30 to 200 nm, more preferably from 50 to 150 nm, most preferably from 60 to 120 nm.

Preferably, the middle-refractivity layer and the high-refractivity layer each are so designed that ultrafine particles of a high-refractivity inorganic compound having a mean particle size of at most 100 nm are dispersed in the matrix material thereof. As the fine particles of a high-refractivity inorganic compound, preferably used here are inorganic compounds having a refractive index of at least 1.65, for example, oxides of Ti, Zn, Sb, Sn, Zr, Ce, Ta, La, In or the like, as well as composite oxides containing such metal atoms, etc.

The ultrafine particles may be used in various embodiments where the particles are surface-treated with a surface-treating agent (e.g., silane coupling agent or the like as in JP-A 11-295503, 11-153703, 2000-9908; anionic compound or organic metal coupling agent as in JP-A 2001-310432), or the particles have a core/shell structure in which a high-refractivity particle is a core (for example, as in JP-A 2001-166104), or the particles are combined with a specific dispersant (for example, as in JP-A 11-153703, U.S. Pat. No. 6,210,858B1, JP-A 2002-277606), etc.

As the matrix material, usable here are heretofore known thermoplastic resins, curable resin films, etc. Also usable are polyfunctional materials as in JP-A 2000-47004, 2001-315242, 2001-31871, 2001-296401, etc.; curable films obtained from metal alkoxide compounds as in JP-A 2001-293818, etc.

Preferably, the refractive index of the high-refractivity layer is from 1.70 to 2.20. Preferably, the thickness of the high-refractivity layer is from 5 nm to 10 μm, more preferably from 10 nm to 1 μm.

The refractive index of the middle-refractivity layer is so controlled as to fall between the refractive index of the low-refractivity layer and the refractive index of the high-refractivity layer. Preferably, the refractive index of the middle-refractivity layer is from 1.50 to 1.70.

Preferably, the haze of the antireflection layer is at most 5%, more preferably at most 3%. Preferably, the strength of the film is on a level of H or more in the pencil hardness test according to JIS K5400, more preferably 2H or more, most preferably 3H or more.

(3) Front Scattering Layer

The film of the invention may have a front scattering layer as the active energy-ray curable layer.

The front scattering layer is used for improving the viewing angle characteristics (color shift and brightness distribution) in all directions when the polarizer of the invention is applied to liquid crystal display devices. In the invention, preferably, the front scattering layer is so designed that fine particles having a different refractive index are dispersed in a binder, for which, for example, employable are the configurations in JP-A 11-38208 where the front scattering coefficient is specifically defined, in JP-A 2000-199809 where the relative refractivity between transparent resin and fine particles is defined to fall within a specific range, in JP-A 2002-107512 where the haze value is defined to be at least 40%, etc. Also preferred is use of the polarizer of the invention as combined with "Lumisty" described in Sumitomo Chemical's Technical Report "Photofunctional Film", pp. 31-39, for the purpose of controlling the viewing angle characteristics of haze.

(4) Antiglare Layer

The film of the invention may have an antiglare layer as the active energy ray-curable layer.

The antiglare layer is used for preventing reflected light from scattering to cause glaring or background reflections. The antiglare function is attained by roughening the outermost surface (panel side) of liquid crystal display devices. Preferably, the haze of the film having such an antiglare function is from 3 to 30%, more preferably from 5 to 20%, most preferably from 7 to 20%.

As the method of roughening the film surface, for example, preferred is a method of adding fine particles to the film to thereby roughen the film surface (for example, as in JP-A 2000-271878), a method of adding a small amount (from 0.1 to 50% by mass) of relatively large particles (having a particle size of from 0.05 to 2 μm) to thereby roughen the film surface (for example, as in JP-A 2000-281410, 2000-95893, 2001-100004, 2001-281407), a method of physically transferring irregularities onto the film surface (for example, as an embossing method, as in JP-A 63-278839, 11-183710, 2000-275401), etc.

The method for forming the active energy ray-curable layer is not specifically defined, for which employable here is any known method. Above all, preferred is a method of applying a solution prepared by dissolving the material to form the active energy ray-curable layer in an organic solvent, onto the cellulose acylate film to form the intended active energy ray-curable layer thereon.

The organic solvent may be any known organic solvent. One alone or two or more different types of organic solvents may be used here either singly or as combined. Above all, preferred for use in the invention are ketone solvents, acetate solvents and hydrocarbon solvents.

The solvent includes, for example, MiBK (methyl isobutyl ketone), MEK (methyl ethyl ketone), ethyl acetate, toluene, etc.

The concrete method of forming the active energy ray-curable layer by coating is not also specifically defined. Preferred is a microgravure coating method. The conveying speed in coating is not also specifically defined. Preferably, the film is coated at a conveying speed of from 1 to 100 m/min. The drying condition after coating is not also specifically defined. Preferably, the drying temperature is from 25 to 140° C. and the drying time is from 30 to 1000 seconds.

For the active energy ray-curable layer, preferred is use of active energy rays of radioactive ray, gamma ray, alpha ray, electron beam, UV ray, etc. More preferred is use of electron ray and UV ray in consideration of safety and producibility. In case where the layer is cured by heat, the heating temperature is preferably not higher than 140° C., more preferably not higher than 100° C. in consideration of the heat resistance of the plastics themselves.

When the layer is irradiated with active energy rays, preferably, the system is kept purged with nitrogen (having an oxygen concentration of at most 0.5%). The intensity and others of the active energy rays to be used are not also specifically defined. For example, in case where the layer is irradiated with UV rays, preferably, the intensity of the rays is from 10 to 1000 mW/cm$^2$, and the dose thereof is from 50 to 5000 mJ/cm$^2$.

(5) Retardation Layer

The film of the invention may have a retardation layer showing predetermined optical characteristics as the active energy ray-curable layer. One example of the curable layer is a retardation layer to be formed by curing a liquid crystal composition in a predetermined alignment state. One example of the liquid crystal composition is a polymerizing liquid crystal composition containing at least one polymerizing liquid crystal such as a polymerizing discotic liquid crystal, a polymerizing rod-shaped liquid crystal, etc. The polymerizing liquid crystal usable here is not specifically defined, and any polymerizing liquid crystal heretofore widely used in formation of retardation layers in the art can be used here.

The preferred thickness of the curable layer varies depending on the use thereof, but is generally from 1 μm to 15 μm, more preferably from 3 μm to 10 μm.

The film having a curable layer that exhibits various functions as above can be used not only for applications that require hardness but also for any other various applications of different types of films. For example, the curable layer may be a surface layer of the surface film to be arranged on the viewers' side of a display device such as a liquid crystal display device, for example, as a layer of controlling the surface profile, or an antiglare layer for controlling the scatterability of the film, or a single-layered or multilayered antireflection layer for controlling the refractivity of the film. The film of the invention having a layer that exhibits such various functions can be used in various applications.

3. Polarizer

The invention also relates to a polarizer having at least the film of the invention and a polarizing element. Preferably, in the polarizer, the film of the invention functions as a protective film for the polarizing element. Preferably, the polarizing element is laminated on the side of the second surface of the film of the invention, or that is, on the surface of the film of the invention having a lower HALS concentration. In this configuration, HALS can be prevented from moving into the polarizing element to worsen the polarizing element. In the embodiment having the active energy ray-curable layer, preferably, the polarizing element is stuck to the side of the film opposite to the side thereof having the curable layer formed thereon. The embodiment of the polarizer of the invention includes not only an embodiment of a polarizer in the form of film sheets as cut in a size capable of being directly incorporated in liquid crystal display devices but also an embodiment of a polarizer in the form of a roll of a long film as continuously produced and wound up into a roll (for example, having a rolled film length of at least 2500 m or at least 3900 m). For large-panel liquid crystal display devices, the width of the polarizer is preferably at least 1470 mm as described above.

The concrete configuration of the polarizer of the invention is not specifically defined, for which is employable any known configuration. For example, the configuration of FIG. 6 in JP-A 2008-262161 is employable here.

Preferably, the polarizer of the invention has an additional film stuck to the back of the polarizing element therein (or that is, the polarizer of the embodiment has an additional film stuck to the side opposite to the side thereof having the film of the invention stuck thereto). Preferably, the additional film functions as a protective film for the polarizing element. The film may also be an optically isotropic film or an optically anisotropic film. The main ingredient of the additional film is not specifically defined. Like the film of the invention, the additional film may be a cellulose acylate film containing a cellulose acylate as the main ingredient thereof, or may be a film containing any other high-molecular-weight material (this is meant to include both of resin and polymer) as the main ingredient thereof. Examples of the other high-molecular-weight material includes cyclic polyolefins, polycarbonates, acrylic resins, etc.

(Cross Transmittance Change)

In this description, the cross transmittance CT of the polarizer is measured using UV3100PC (by Shimadzu). For the measurement, one sample was analyzed ten times all at 410 nm, and the data were averaged.

The polarizer durability test can be carried out as follows: The polarizer is stuck to a glass base with an adhesive, and two and the same samples thereof are prepared (about 5 cm×5 cm each). In single plate cross transmittance measurement, the sample is so set that its film side could face the light source, and analyzed in that condition. Two these samples are analyzed, and the data are averaged to give the cross transmittance of the polarizer of the invention.

Preferably, in the polarizer durability test, the polarizer of the invention has a smaller change.

Preferably, the single plate cross transmittance change (%) of the polarizer of the invention, when kept at 60° C. and at a relative humidity of 95% for 1000 hours, is at most 1.40%.

The single plate cross transmittance change (%), when kept at 60° C. and at a relative humidity of 95% for 1000 hours, is more preferably at most 1.00%, even more preferably at most 0.50%. In this, the change means the value computed by subtracting the measured value before the test from the measured value after the test.

When the polarizer satisfies the above-mentioned range of cross transmittance change, the polarizer is favorable as capable of securing the safety in long-term use or during storage thereof in high-temperature high-humidity environments.

[Liquid Crystal Display Device]

The invention also relates to a liquid crystal display device comprising at least the cellulose acylate film of the invention.

The film of the invention may be incorporated in the liquid crystal display device as a part of the polarizer therein stuck to a polarizing element.

One example of the liquid crystal display device of the invention comprises a liquid crystal cell and a pair of polarizers arranged on both sides of the liquid crystal cell, in which at least one polarizer is the polarizer of the invention. The mode of the liquid crystal display device is not specifically defined, including various display modes of TN (twisted nematic), IPS (in-plane switching), FLC (ferroelectric liquid crystal), AFLC (anti-ferroelectric liquid crystal), OCB (optically compensatory bend), STN (supper twisted nematic), VA (vertically aligned) and HAN (hybrid aligned nematic).

EXAMPLES

The invention is described more concretely with reference to the following Examples. In the following Examples, the materials, the reagents and the substances used, their amount and ratio, the details of the treatment and the treatment process may be suitably modified or changed not overstepping the spirit and the scope of the invention. Accordingly, the invention should not be limited to the following Examples.

1. Production of Cellulose Acylate Film

A dope for core layer formation, a dope for air-side surface layer formation and a dope for support-side surface layer formation were prepared as in the Tables mentioned below. Concretely, the ingredients shown in the Tables were put into a mixing tank, dissolved by stirring, and then filtered through a paper filter having a mean pore side of 34 μm and a sintered metal filter having a mean pore size of 10 μm, thereby preparing the cellulose acylate dopes.

Of the dope solvents in the following Tables, methylene chloride is a good solvent for cellulose acylate.

Next, the support-side surface layer dope, the core layer dope and the air-wide surface layer dope were simultaneously cocast onto a metal support cooled at −10° C. in that order from the support side through one casting die, each at a controlled flow rate in such a manner that the final thickness of each constitutive layer could be as in the Tables mentioned below, and gelled on the support. After gelled, the laminate film was peeled away from the support, then conveyed while dried at 30 to 40° C., and thereafter set on a tenter and post-dried at 130° C.

In Examples 8 to 10 and Comparative Examples 4 to 6, the dried unstretched film was held with the clips of the tenter in the cross direction thereof, and while heated at 180° C., this was stretched in the cross direction (in the direction perpendicular to the casting direction) in the draw ratio shown in Table 5, thereby producing a stretched film having a thickness of 60 μm, and the film was evaluated.

In Examples 11 to 13 and Comparative Examples 7 to 9, the film was peeled away from the support, and while both sides in the cross direction of the film were held with a pin tenter (as shown in FIG. 3 in JP-A 4-1009), the film was stretched in the cross direction in the ratio shown in Table 5, thereby producing a stretched film, and the film was evaluated.

In the manner as above, the films of Examples 1 to 13 and Comparative Examples 1 to 10 were produced. In the following Tables, the dope composition and the layer thickness of each constitutive layer are shown.

TABLE 1

Air-Side Skin Layer

| | Plasticizer 1 | | Plasticizer 2 | | Antioxidant | | Dope Solvent Ratio | Starting Cellulose | | Layer |
| | | | | | | | | acetyl | Mw (×10⁻⁴) | Thick- |
| | compound | amount added[a] | compound | amount added[a] | compound | amount added[a] | methylene chloride/ methanol/butanol | substitution degree | (NMP solvent) | ness (μm) |
|---|---|---|---|---|---|---|---|---|---|---|
| Example 1 | TPP | 2.7 | BDP | 1.3 | CHIMASSORB 2020FDL | 0.5 | 92/8/0 | 2.77 | 56.7 | 3 |
| Example 2 | TPP | 2.7 | BDP | 1.3 | CHIMASSORB 2020FDL | 1 | 92/8/0 | 2.77 | 56.7 | 3 |
| Example 3 | TPP | 2.7 | BDP | 1.3 | CHIMASSORB 2020FDL | 2 | 92/8/0 | 2.77 | 56.7 | 3 |
| Example 4 | TPP | 2.7 | BDP | 1.3 | CHIMASSORB 2020FDL | 2 | 92/8/0 | 2.77 | 56.7 | 3 |
| Example 5 | TPP | 2.7 | BDP | 1.3 | CHIMASSORB 2020FDL | 2 | 92/8/0 | 2.85 | 56.7 | 3 |
| Example 6 | TPP | 2.7 | BDP | 1.3 | CHIMASSORB 2020FDL | 8 | 92/8/0 | 2.77 | 56.7 | 9 |
| Example 7 | polyalcohol ester 1 | 3 | polyalcohol ester 2 | 1 | CHIMASSORB 2020FDL | 2 | 92/8/0 | 2.77 | 56.7 | 3 |
| Example 8 | polyalcohol ester 1 | 3 | polyalcohol ester 2 | 1 | CHIMASSORB 2020FDL | 2 | 92/8/0 | 2.77 | 56.7 | 3 |
| Example 9 | polyalcohol ester 1 | 3 | polyalcohol ester 2 | 1 | CHIMASSORB 2020FDL | 2 | 92/8/0 | 2.77 | 56.7 | 3 |
| Example 10 | polyalcohol ester 1 | 3 | polyalcohol ester 2 | 1 | CHIMASSORB 2020FDL | 2 | 92/8/0 | 2.77 | 56.7 | 3 |
| Example 11 | polyalcohol ester 1 | 3 | polyalcohol ester 2 | 1 | CHIMASSORB 2020FDL | 2 | 92/8/0 | 2.77 | 56.7 | 3 |
| Example 12 | polyalcohol ester 1 | 3 | polyalcohol ester 2 | 1 | CHIMASSORB 2020FDL | 2 | 92/8/0 | 2.77 | 56.7 | 3 |
| Example 13 | polyalcohol ester 1 | 3 | polyalcohol ester 2 | 1 | CHIMASSORB 2020FDL | 2 | 92/8/0 | 2.77 | 56.7 | 3 |
| Comparative Example 1 | TPP | 2.7 | BDP | 1.3 | — | 0 | 82.5/17.0/0.5 | 2.85 | 42.7 | 3 |
| Comparative Example 2 | TPP | 2.7 | BDP | 1.3 | — | 0 | 92/8/0 | 2.77 | 56.7 | 3 |
| Comparative Example 3 | polyalcohol ester 1 | 3 | polyalcohol ester 2 | 1 | — | 0 | 82.5/17.0/0.5 | 2.85 | 42.7 | 3 |
| Comparative Example 4 | polyalcohol ester 1 | 3 | polyalcohol ester 2 | 1 | — | 0 | 82.5/17.0/0.5 | 2.85 | 42.7 | 3 |
| Comparative Example 5 | polyalcohol ester 1 | 3 | polyalcohol ester 2 | 1 | — | 0 | 82.5/17.0/0.5 | 2.85 | 42.7 | 3 |
| Comparative Example 6 | polyalcohol ester 1 | 3 | polyalcohol ester 2 | 1 | — | 0 | 82.5/17.0/0.5 | 2.85 | 42.7 | 3 |
| Comparative Example 7 | polyalcohol ester 1 | 3 | polyalcohol ester 2 | 1 | — | 0 | 82.5/17.0/0.5 | 2.85 | 42.7 | 3 |
| Comparative Example 8 | polyalcohol ester 1 | 3 | polyalcohol ester 2 | 1 | — | 0 | 82.5/17.0/0.5 | 2.85 | 42.7 | 3 |
| Comparative Example 9 | polyalcohol ester 1 | 3 | polyalcohol ester 2 | 1 | — | 0 | 82.5/17.0/0.5 | 2.85 | 42.7 | 3 |
| Comparative Example 10 | TPP | 2.7 | BDP | 1.3 | CHIMASSORB 2020FDL | 0.5 | 82.5/17.0/0.5 | 2.85 | 42.7 | 3 |

TPP means triphenyl phosphate, and BDP means biphenyldiphenyl phosphate.
CHIMASSORB 2020FDL: hindered amine-type antioxidant ("CHIMASSORB 2020FDL" by BASF (formerly by Ciba Specialty Chemicals))
[a] part by mass relative to 100 parts by mass of cellulose acylate

TABLE 2

Core Layer

| | Plasticizer 1 | | Plasticizer 2 | | Antioxidant | | Dope Solvent Ratio | Starting Cellulose | | Layer |
| | | | | | | | | acetyl | Mw (×10⁻⁴) | Thick- |
| | compound | amount added[a] | compound | amount added[a] | compound | amount added[a] | methylene chloride/ methanol/butanol | substitution degree | (NMP solvent) | ness (μm) |
|---|---|---|---|---|---|---|---|---|---|---|
| Example 1 | TPP | 8.6 | BDP | 4.3 | — | 0 | 82.5/17.0/0.5 | 2.85 | 42.7 | 54 |
| Example 2 | TPP | 8.6 | BDP | 4.3 | — | 0 | 82.5/17.0/0.5 | 2.85 | 42.7 | 54 |
| Example 3 | TPP | 8.6 | BDP | 4.3 | — | 0 | 82.5/17.0/0.5 | 2.85 | 42.7 | 54 |
| Example 4 | TPP | 8.6 | BDP | 4.3 | — | 0 | 82.5/17.0/0.5 | 2.85 | 42.7 | 54 |
| Example 5 | TPP | 8.6 | BDP | 4.3 | — | 0 | 82.5/17.0/0.5 | 2.85 | 42.7 | 54 |
| Example 6 | TPP | 10.7 | BDP | 5.3 | — | 0 | 82.5/17.0/0.5 | 2.85 | 42.7 | 42 |
| Example 7 | polyalcohol | 9.7 | polyalcohol | 3.2 | — | 0 | 82.5/17.0/0.5 | 2.85 | 42.7 | 54 |

TABLE 2-continued

Core Layer

| | Plasticizer 1 | | Plasticizer 2 | | Antioxidant | | Dope Solvent Ratio | Starting Cellulose | | Layer |
| | | | | | | | | acetyl | Mw (×10⁻⁴) | Thick- |
| | compound | amount added[a] | compound | amount added[a] | compound | amount added[a] | methylene chloride/ methanol/butanol | substitution degree | (NMP solvent) | ness (μm) |
|---|---|---|---|---|---|---|---|---|---|---|
| Example 8 | polyalcohol ester 1 | 9.7 | polyalcohol ester 2 | 3.2 | — | 0 | 82.5/17.0/0.5 | 2.85 | 42.7 | 54 |
| Example 9 | polyalcohol ester 1 | 9.7 | polyalcohol ester 2 | 3.2 | — | 0 | 82.5/17.0/0.5 | 2.85 | 42.7 | 54 |
| Example 10 | polyalcohol ester 1 | 9.7 | polyalcohol ester 2 | 3.2 | — | 0 | 82.5/17.0/0.5 | 2.85 | 42.7 | 54 |
| Example 11 | polyalcohol ester 1 | 9.7 | polyalcohol ester 2 | 3.2 | — | 0 | 82.5/17.0/0.5 | 2.85 | 42.7 | 54 |
| Example 12 | polyalcohol ester 1 | 9.7 | polyalcohol ester 2 | 3.2 | — | 0 | 82.5/17.0/0.5 | 2.85 | 42.7 | 54 |
| Example 13 | polyalcohol ester 1 | 9.7 | polyalcohol ester 2 | 3.2 | — | 0 | 82.5/17.0/0.5 | 2.85 | 42.7 | 54 |
| Comparative Example 1 | TPP | 8.6 | BDP | 4.3 | — | 0 | 82.5/17.0/0.5 | 2.85 | 42.7 | 54 |
| Comparative Example 2 | TPP | 8.6 | BDP | 4.3 | — | 0 | 82.5/17.0/0.5 | 2.85 | 42.7 | 54 |
| Comparative Example 3 | polyalcohol ester 1 | 9.7 | polyalcohol ester 2 | 3.2 | — | 0 | 82.5/17.0/0.5 | 2.85 | 42.7 | 54 |
| Comparative Example 4 | polyalcohol ester 1 | 9.7 | polyalcohol ester 2 | 3.2 | — | 0 | 82.5/17.0/0.5 | 2.85 | 42.7 | 54 |
| Comparative Example 5 | polyalcohol ester 1 | 9.7 | polyalcohol ester 2 | 3.2 | — | 0 | 82.5/17.0/0.5 | 2.85 | 42.7 | 54 |
| Comparative Example 6 | polyalcohol ester 1 | 9.7 | polyalcohol ester 2 | 3.2 | — | 0 | 82.5/17.0/0.5 | 2.85 | 42.7 | 54 |
| Comparative Example 7 | polyalcohol ester 1 | 9.7 | polyalcohol ester 2 | 3.2 | — | 0 | 82.5/17.0/0.5 | 2.85 | 42.7 | 54 |
| Comparative Example 8 | polyalcohol ester 1 | 9.7 | polyalcohol ester 2 | 3.2 | — | 0 | 82.5/17.0/0.5 | 2.85 | 42.7 | 54 |
| Comparative Example 9 | polyalcohol ester 1 | 9.7 | polyalcohol ester 2 | 3.2 | — | 0 | 82.5/17.0/0.5 | 2.85 | 42.7 | 54 |
| Comparative Example 10 | TPP | 8.6 | BDP | 4.3 | CHIMASSORB 2020FDL | 0.5 | 82.5/17.0/0.5 | 2.85 | 42.7 | 54 |

TPP means triphenyl phosphate, and BDP means biphenyldiphenyl phosphate.
CHIMASSORB 2020FDL: hindered amine-type antioxidant ("CHIMASSORB 2020FDL" by BASF (formerly by Ciba Specialty Chemicals))
[a] part by mass relative to 100 parts by mass of cellulose acylate

TABLE 3

Support-Side Skin Layer

| | Plasticizer 1 | | Plasticizer 2 | | Antioxidant | | Dope Solvent Ratio | Starting Cellulose | | Layer |
| | | | | | | | | acetyl | Mw (×10⁻⁴) | Thick- |
| | compound | amount added[a] | compound | amount added[a] | compound | amount added[a] | methylene chloride/ methanol/butanol | substitution degree | (NMP solvent) | ness (μm) |
|---|---|---|---|---|---|---|---|---|---|---|
| Example 1 | TPP | 2.7 | BDP | 1.3 | — | 0 | 82.5/17.0/0.5 | 2.85 | 42.7 | 3 |
| Example 2 | TPP | 2.7 | BDP | 1.3 | — | 0 | 82.5/17.0/0.5 | 2.85 | 42.7 | 3 |
| Example 3 | TPP | 2.7 | BDP | 1.3 | — | 0 | 82.5/17.0/0.5 | 2.85 | 42.7 | 3 |
| Example 4 | TPP | 2.7 | BDP | 1.3 | — | 0 | 82.5/17.0/0.5 | 2.85 | 42.7 | 3 |
| Example 5 | TPP | 2.7 | BDP | 1.3 | — | 0 | 82.5/17.0/0.5 | 2.85 | 42.7 | 3 |
| Example 6 | TPP | 2.7 | BDP | 1.3 | — | 0 | 82.5/17.0/0.5 | 2.85 | 42.7 | 3 |
| Example 7 | polyalcohol ester 1 | 3 | polyalcohol ester 2 | 1 | — | 0 | 82.5/17.0/0.5 | 2.85 | 42.7 | 3 |
| Example 8 | polyalcohol ester 1 | 3 | polyalcohol ester 2 | 1 | — | 0 | 82.5/17.0/0.5 | 2.85 | 42.7 | 3 |
| Example 9 | polyalcohol ester 1 | 3 | polyalcohol ester 2 | 1 | — | 0 | 82.5/17.0/0.5 | 2.85 | 42.7 | 3 |
| Example 10 | polyalcohol ester 1 | 3 | polyalcohol ester 2 | 1 | — | 0 | 82.5/17.0/0.5 | 2.85 | 42.7 | 3 |
| Example 11 | polyalcohol ester 1 | 3 | polyalcohol ester 2 | 1 | — | 0 | 82.5/17.0/0.5 | 2.85 | 42.7 | 3 |
| Example 12 | polyalcohol ester 1 | 3 | polyalcohol ester 2 | 1 | — | 0 | 82.5/17.0/0.5 | 2.85 | 42.7 | 3 |
| Example 13 | polyalcohol ester 1 | 3 | polyalcohol ester 2 | 1 | — | 0 | 82.5/17.0/0.5 | 2.85 | 42.7 | 3 |

TABLE 3-continued

| | Support-Side Skin Layer | | | | | | | Starting Cellulose | | Layer |
| | Plasticizer 1 | | Plasticizer 2 | | Antioxidant | | Dope Solvent Ratio | acetyl | Mw (×10⁻⁴) | Thick- |
| | compound | amount added[a] | compound | amount added[a] | compound | amount added[a] | methylene chloride/ methanol/butanol | substitution degree | (NMP solvent) | ness (μm) |
|---|---|---|---|---|---|---|---|---|---|---|
| Comparative Example 1 | TPP | 2.7 | BDP | 1.3 | — | 0 | 82.5/17.0/0.5 | 2.85 | 42.7 | 3 |
| Comparative Example 2 | TPP | 2.7 | BDP | 1.3 | — | 0 | 82.5/17.0/0.5 | 2.85 | 42.7 | 3 |
| Comparative Example 3 | polyalcohol ester 1 | 3 | polyalcohol ester 2 | 1 | — | 0 | 82.5/17.0/0.5 | 2.85 | 42.7 | 3 |
| Comparative Example 4 | polyalcohol ester 1 | 3 | polyalcohol ester 2 | 1 | — | 0 | 82.5/17.0/0.5 | 2.85 | 42.7 | 3 |
| Comparative Example 5 | polyalcohol ester 1 | 3 | polyalcohol ester 2 | 1 | — | 0 | 82.5/17.0/0.5 | 2.85 | 42.7 | 3 |
| Comparative Example 6 | polyalcohol ester 1 | 3 | polyalcohol ester 2 | 1 | — | 0 | 82.5/17.0/0.5 | 2.85 | 42.7 | 3 |
| Comparative Example 7 | polyalcohol ester 1 | 3 | polyalcohol ester 2 | 1 | — | 0 | 82.5/17.0/0.5 | 2.85 | 42.7 | 3 |
| Comparative Example 8 | polyalcohol ester 1 | 3 | polyalcohol ester 2 | 1 | — | 0 | 82.5/17.0/0.5 | 2.85 | 42.7 | 3 |
| Comparative Example 9 | polyalcohol ester 1 | 3 | polyalcohol ester 2 | 1 | — | 0 | 82.5/17.0/0.5 | 2.85 | 42.7 | 3 |
| Comparative Example 10 | TPP | 2.7 | BDP | 1.3 | CHIMASSORB 2020FDL | 0.5 | 82.5/17.0/0.5 | 2.85 | 42.7 | 3 |

TPP means triphenyl phosphate, and BDP means biphenyldiphenyl phosphate.
CHIMASSORB 2020FDL: hindered amine-type antioxidant ("CHIMASSORB 2020FDL" by BASF (formerly by Ciba Specialty Chemicals))
[a]part by mass relative to 100 parts by mass of cellulose acylate The additives used here are as follows:

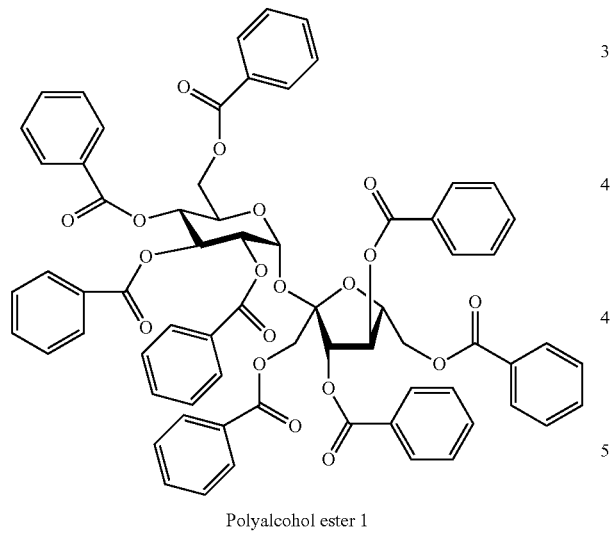

Polyalcohol ester 1

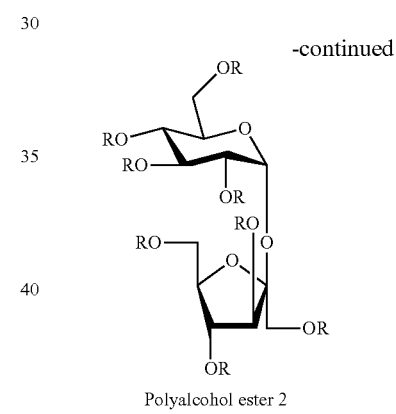

Polyalcohol ester 2

R=acetyl group/1-butyryl group (2/6)

2. Formation of Active Energy Ray-Curable Layer

Hard coat layer coating liquids 1 to 6 mentioned below were prepared. Briefly, the ingredients were mixed, and filtered through a polypropylene filter having a pore side of 30 μm to prepare the hard coat layer coating liquids 1 to 6.

TABLE 4

| | Monomer 1 | Monomer 2 | Monomer 1/ Monomer 2 | Amount of Monomers (1 + 2) Added | UV Initiator | Amount of UV Initiator Adder[*1] | Solvent 1 | Solvent 2 | Solvent 1/ Solvent 2 |
|---|---|---|---|---|---|---|---|---|---|
| Hard Coat 1 | pentaerythritol triacrylate | pentaerythritol tetracrylate | 3/2 | 53.5 | UV initiator 1 (Irg 127) | 1.5 | ethyl acetate | — | — |
| Hard Coat 2 | pentaerythritol triacrylate | pentaerythritol tetracrylate | 3/2 | 53.5 | UV initiator 1 (Irg 127) | 1.5 | ethyl acetate | methyl ethyl ketone | 1/1 |
| Hard Coat 3 | pentaerythritol triacrylate | pentaerythritol tetracrylate | 3/2 | 53.5 | UV initiator 1 (Irg 127) | 1.5 | toluene | methyl isobutyl ketone | 9/1 |

TABLE 4-continued

|  | Monomer 1 | Monomer 2 | Monomer 1/ Monomer 2 | Amount of Monomers (1 + 2) Added | UV Initiator | Amount of UV Initiator Adder*[1] | Solvent 1 | Solvent 2 | Solvent 1/ Solvent 2 |
|---|---|---|---|---|---|---|---|---|---|
| Hard Coat 4 | dipentaerythritol hexacrylate | — | — | 53.5 | UV initiator 1 (Irg 127) | 1.5 | toluene | methyl isobutyl ketone | 9/1 |
| Hard Coat 5 | urethane acrylate (UV1700B) | — | — | 53.5 | UV initiator 2 (Irg 184) | 1.5 | ethanol | toluene | 7/3 |
| Hard Coat 6 | urethane acrylate (UV1700B) | — | — | 53.5 | UV initiator 2 (Irg 184) | 1.5 | ethanol | cyclohexanone | 7/3 |

"UV1700B" (by Nippon Gohsei)
"Irg 127" (by BASF, (formerly by Ciba Specialty Chemicals))
"Irg 184" (by BASF, (formerly by Ciba Specialty Chemicals))
*[1]% by mass relative to the total weight of the solvent-containing solution for hard coat layer formation The coating liquid 1 for hard coat layer was applied onto the sir-side surface of the cellulose acylate film produced as above, according to amicrogravure coating method at a conveying speed of 30 m/min. After dried at 60° C. for 150 seconds, the coating layer was cured by irradiation with UV rays at an illuminance of 400 mW/cm$^2$ and at an irradiation dose of 150 mJ/cm$^2$ using a 160 W/cm air-cooled metal halide lamp (by Eye Graphics), with purging with nitrogen (oxygen concentration, at most 0.5%), thereby producing a hard coat layer (thickness 6 μm).

Accordingly, hard coat layer-having cellulose acylate films were produced, in which the hard coat layer was formed on the air-side surface of the cellulose acylate film.

3. Production of Polarizer

The hard coat layer-having cellulose acylate film produced in the above was dipped in an aqueous solution of 2.3 mol/L sodium hydroxide at 55° C. for 3 minutes. This was washed in a water-washing bath at room temperature, and then neutralized with 0.05 mol/L sulfuric acid at 30° C. Again this was washed with a water-washing bath at room temperature and then dried with hot air at 100° C. Accordingly, the surface of the film was saponified.

A stretched polyvinyl alcohol film was made to adsorb iodine to prepare a polarizing element.

Using a polyvinyl alcohol adhesive, the saponified, hard coat layer-having cellulose acylate film was stuck to one side of the polarizing element. In this, the side of the film not having the hard coat layer thereon, or that is, the surface of the support-side surface layer of the cellulose acylate film was stuck to the polarizing element. A commercially-available cellulose triacetate film (Fujitac TD80UF by FUJIFILM) was saponified in the same manner as above, and using a polyvinyl alcohol adhesive, the thus-saponified cellulose triacetate film was stuck to the other side of the polarizing element to which the hard coat layer-having cellulose acylate film had been stuck.

In this, the polarizing element and the hard coat layer-having cellulose acylate film were so arranged that the transmission axis of the former could be perpendicular to the slow axis of the latter. In addition, the polarizing element and the commercially-available cellulose triacetate film were also so arranged that the transmission axis of the former could be perpendicular to the slow axis of the latter.

In that manner, hard coat layer-having polarizers of Examples 1 to 10 and Comparative Examples 1 to 9 were produced.

4. Evaluation (Evaluation of Light-Resistant Adhesiveness)

Using Suga Test Instruments' Super Xenon Weather Meter SX75, the hard coat layer-having polarizer protective film of Examples and Comparative Examples produced in the above was irradiated with light for 100 hours at 60° C. and at a relative humidity of 50%.

Next, the hard coat layer-having polarizer protective film was conditioned at a temperature of 25° c. and at a relative humidity of 60% for 2 hours. Using a cutter knife, the surface of the hard coat layer of the film was cut at 11 vertical lines and 11 horizontal lines to thereby form 100 square crosscuts in total. A Nitto Denko's polyester adhesive tape (No. 31B) was stuck to the thus-cut surface of the tape. After 30 minutes, the adhesive tape was rapidly peeled off in the vertical direction, whereupon the number of the peeled crosscuts was counted. The film was evaluated according to four ranks mentioned below. The same adhesiveness test was carried out three times for every sample, and the data were averaged. The results are shown in the following Table.

A: All 100 crosscuts did not peel at all (acceptable).
B: From 1 to 5 of 100 crosscuts peeled (acceptable).
C: From 6 to 10 of 100 crosscuts peeled.
D: 11 or more of 100 crosscuts peeled.

(Evaluation of Polarizer Durability)

The polarizers of Examples and Comparative Examples produced in the above were analyzed for the cross transmittance thereof at a wavelength of 410 nm, according to the method described hereinabove.

Next, the polarizers were stored in an environment at 60° C. and at a relative humidity of 95% for 1000 hours, and their cross transmittance was measured in the same manner as above. The cross transmittance change before and after the storage was computed and referred to as a polarizer durability, and the results are shown in the following Table 5. The relative humidity in the environment with no humidity conditioning was within a range of from 0% to 20%.

The results are shown in the following Table.

(Pencil Hardness Evaluation Method)

The hard coat-formed, UV-cured sample was conditioned at 25° C. and at a relative humidity of 60% for 2 hours, and then, using a test pencil as defined by JIS S 6006, the sample was scratched with the pencil having a different hardness under a weight of 500 g applied thereto, according to the pencil hardness test method defined by JIS K 5400. Every sample was tested for a total of 5 times with the pencil having the same hardness. The hardness of the pencil with which the sample was not scratched 3 times or more was referred to as the hardness of the sample. The scratch as defined by JIS K 5400 is said to include coating film breaking and coating film scratching but not to include coating film denting. However, in this, the scratch includes coating film denting. The higher number of the result indicates a higher hardness of the tested sample.

(Determination of Abundance Ratio C1/C2 of Hindered Amine-Type Compound)

The cellulose acylate film of Examples and Comparative Examples produced in the above was cut at an angle of 1° relative to the film plane, and the formed film cross section was mapped through time-of-flight secondary ion mass spectrometry (TOF-SIMS). In TOF-SIMS, for example, Phi Evans' TRIFTII-Model TOF-SIMS (trade name) was used, and from the peak intensity ratio of the specific fragment ions caused by the molecules existing in the film surface, the ratio C1/C2 was computed. In this, C1 is the concentration of the hindered amine-type compound (antioxidant) at the position of a depth of 3 μm from the hard coat layer-formed surface of the cellulose acylate film; and C2 is the concentration of the hindered amine-type compound (antioxidant) at the position of a depth of 3 μm from the other surface of the film.

The obtained results are shown in the following Table.

(Quantitative Determination of Plasticizer Amount)

Before coated with the hard coat layer, the cellulose acylate film was evaluated by quantitatively determining the amount of the plasticizer in the film surface (in the air-side surface layer) through TOF-SIMS (time-of-flight secondary ion mass spectrometry). For example, in TOF-SIMS, Phi Evans' TRIFTII-Model TOF-SIMS (trade name) was used, and the fragment caused by the plasticizer existing in the film surface was detected. The method of TOF-SIMS is described concretely in "Surface Analysis Technology Library—Secondary Ion Mass Spectrometry", edited by The Surface Science Society of Japan, Maruzen Publishing (1999).

For example, a film containing a phosphate-type plasticizer added thereto is analyzed as follows: A test sample containing a predetermined amount of the phosphate plasticizer, and a control sample not containing it (0 part by mass) are tried. From the intensity of the secondary ion derived from the $C_{12}H_{10}PO_4$-end of the phosphate additive, a calibration curve is prepared, and the content of the plasticizer in the surface layer is read on the curve.

(Acyl Substitution Degree and Weight-Average Molecular Weight of Cellulose Acylate)

The acyl substitution degree and the weight-average molecular weight of the cellulose acylate existing in the position of 3 μm and 10 μm in the thickness direction from the surface of the air-side surface layer were measured according to GPC using a solvent NMP. In every sample, it was confirmed that the acyl substitution degree and the weight-average molecular weight of the cellulose acylate existing in the position of 3 μm in the thickness direction were the same as the acyl substitution degree and the weight-average molecular weight of the cellulose acylate used in preparing the dope for formation of the air-side surface layer, and that the acyl substitution degree and the weight-average molecular weight of the cellulose acylate existing in the position of 10 μm in the thickness direction were the same as the acyl substitution degree and the weight-average molecular weight of the cellulose acylate used in preparing the dope for formation of the core layer.

TABLE 5

| | Total Film Thickness (μm) | Surface Stuck to Polarizing Element | Surface Coated with Hard Coat | Amount of Hindered Amine Compound in Entire Film[a] | Hindered Amine Compound Concentration Ratio C1/C2 | Amount of Plasticizer in Entire Film[a] | Plasticizer Concentration Ratio A/B | Stretching of Formed Film draw ratio 180° C. | Tenter Stretching during Film Formation draw ratio | Adhesiveness Evaluation | Polarizer Durability: cross transmittance change (%) 60° C. relative humidity 95% 1000 hours | Pencil Hardness | Pencil Hardness Score 3H (/5) |
|---|---|---|---|---|---|---|---|---|---|---|---|---|---|
| Example 1 | 60 | support side | air side | 0.03 | 35 | 12.0 | 0.51 | — | — | B | 0.79 | 2H | 2 |
| Example 2 | 60 | support side | air side | 0.05 | 55 | 12.0 | 0.54 | — | — | A | 0.80 | 2H | 2 |
| Example 3 | 60 | support side | air side | 0.10 | 60 | 12.0 | 0.52 | — | — | A | 0.80 | 2H | 2 |
| Example 4 | 60 | support side | air side | 0.10 | 60 | 12.0 | 0.52 | — | — | B | 0.80 | 2H | 2 |
| Example 5 | 60 | support side | air side | 1.20 | 60 | 12.0 | 0.52 | — | — | B | 0.80 | 2H | 2 |
| Example 6 | 60 | support side | air side | 1.20 | 10 | 12.4 | 0.45 | — | — | A | 1.10 | 2H | 2 |
| Example 7 | 60 | support side | air side | 0.10 | 39 | 12.0 | 0.46 | — | — | A | 0.65 | 3H | 3 |
| Example 8 | 60 | support side | air side | 0.10 | 39 | 12.0 | 0.46 | 15% | — | A | 0.67 | 3H | 4 |
| Example 9 | 60 | support side | air side | 0.10 | 39 | 12.0 | 0.46 | 20% | — | B | 0.70 | 3H | 5 |
| Example 10 | 60 | support side | air side | 0.10 | 39 | 12.0 | 0.46 | 25% | — | B | 0.68 | 3H | 5 |
| Example 11 | 60 | support side | air side | 0.10 | 39 | 12.0 | 0.46 | — | 15% | A | 0.71 | 3H | 4 |
| Example 12 | 60 | support side | air side | 0.10 | 39 | 12.0 | 0.46 | — | 20% | B | 0.70 | 3H | 5 |
| Example 13 | 60 | support side | air side | 0.10 | 39 | 12.0 | 0.46 | — | 25% | B | 0.69 | 3H | 5 |
| Comparative Example 1 | 60 | support side | air side | 0.00 | — | 12.0 | 0.86 | — | — | D | 0.78 | 2H | 2 |
| Comparative Example 2 | 60 | support side | air side | 0.00 | — | 12.0 | 0.86 | — | — | C | — | — | — |
| Comparative Example 3 | 60 | support side | air side | 0.00 | — | 12.0 | 0.86 | — | — | C | 0.71 | 3H | 3 |
| Comparative Example 4 | 60 | support side | air side | 0.00 | — | 12.0 | 0.86 | 15% | — | C | 0.70 | 3H | 4 |
| Comparative Example 5 | 60 | support side | air side | 0.00 | — | 12.0 | 0.86 | 20% | — | D | 0.72 | 3H | 5 |
| Comparative Example 6 | 60 | support side | air side | 0.00 | — | 12.0 | 0.86 | 25% | — | D | 0.74 | 3H | 5 |
| Comparative Example 7 | 60 | support side | air side | 0.00 | — | 12.0 | 0.86 | — | 15% | C | 0.75 | 3H | 4 |
| Comparative Example 8 | 60 | support side | air side | 0.00 | — | 12.0 | 0.86 | — | 20% | D | 0.72 | 3H | 5 |
| Comparative Example 9 | 60 | support side | air side | 0.00 | — | 12.0 | 0.86 | — | 25% | D | 0.71 | 3H | 5 |
| Comparative Example 10 | 60 | support side | air side | 0.50 | 1.0 | 12.0 | 0.84 | — | — | A | 3.56 | 2H | 2 |

[a]part by mass relative to 100 parts by mass of cellulose acylate

It is known that Examples 1 to 13 are excellent in light-resistance hardness and polarizer durability as compared with Comparative Examples. In Examples 8 to 13 with stretching treatment, all the films had a high pencil hardness. In these Examples, HALS was added to only the air-side surface layer of the film; however, the films produced by adding the additive to the support-side surface thereof were also good.

Hard coat layer-having polarizers were produced in the same manner as above except that the hard coat layer coating liquid 2 to 6 was used in place of the hard coat layer coating liquid used in the above Examples, and tested in the same manner as above. The polarizers enjoyed the same advantages as in the above Tables.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2011-238232, filed on Oct. 31, 2011 and Japanese Patent Application No. 2012-186406, filed on Aug. 27, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A film comprising a curable layer of an active energy ray-curable composition on a first film surface, and a cellulose acylate, a hindered amine compound in an amount of at least 0.001% by mass relative to the cellulose acylate, and a plasticizer, and satisfying the following conditions (i), (ii), (iiia), and (iiib):
  (i) A concentration C1 of the hindered amine compound at a position of 3 μm from the first film surface in the thickness direction is higher than a concentration C2 of the hindered amine compound at a position of 3 μm from the second film surface in the thickness direction;
  (ii) A concentration A of the plasticizer at the position of 3 μm from the first film surface in the thickness direction is lower than a concentration B of the plasticizer at a position of 10 μm from the first film surface in the thickness direction;
  (iiia) An acyl substitution degree a of the cellulose acylate at the position of 3 μm from the first film surface in the thickness direction is lower than an acyl substitution degree b of the cellulose acylate at the position of 10 μm from the first film surface in the thickness direction;
  (iiib) A weight-average molecular weight Ma of the cellulose acylate at the position of 3 μm from the first film surface in the thickness direction is higher than a weight-average molecular weight Mb of the cellulose acylate at the position of 10 μm from the first film surface in the thickness direction,
wherein the acyl substitution degree a of the cellulose acylate at the position of 3 μm from the first film surface in the thickness direction is greater than 2.75 and less than or equal to 2.85, wherein the weight-average molecular weight Ma of the cellulose acylate at the position of 3 μm from the first film surface in the thickness direction is from $40 \times 10^4$ to $60 \times 10^4$, wherein the plasticizer comprises at least one selected from the group consisting of carboxylates, polyalcohols, aliphatic dibasic acid esters, acetates, polyesters, epoxy esters, ricinoleate esters, polyolefins, and polyethylene glycol compounds, and wherein the molecular weight of the hindered amine compound is from 700 to 50000.

2. The film according to claim 1, comprising a core layer and a first surface layer that constitutes from the first film surface to a position to reach the core layer.

3. The film according to claim 2, further comprising a second surface layer that constitutes from the second film surface to a position to reach the core layer.

4. The film according to claim 1, wherein the concentration C1 of the hindered amine compound at the position of 3 μm from the first film surface in the thickness direction is at least 0.5% by mass and the concentration C2 of the hindered amine compound at the position of 3 μm from the second film surface in the thickness direction is less than 0.5% by mass.

5. The film according to claim 1, wherein the ratio of concentration C1/concentration C2 is at least 2.

6. The film according to claim 1, wherein the concentration A of the plasticizer at the position of 3 μm from the first film surface in the thickness direction is at most 5% by mass and the concentration B of the plasticizer at the position of 10 μm from the first film surface in the thickness direction is more than 5% by mass.

7. The film according to claim 1, wherein the concentration A of the plasticizer at the position of 3 μm from the first film surface in the thickness direction is lower than the concentration B of the plasticizer at the position of 10 μm from the first film surface in the thickness direction by at least 3% by mass.

8. The film according to claim 1, wherein the acyl substitution degree b of the cellulose acylate at the position of 10 μm from the first film surface in the thickness direction is from 2.80 to 3.0.

9. The film according to claim 1, wherein the weight-average molecular weight Mb is from $30 \times 10^4$ to $45 \times 10^4$.

10. The film according to claim 1, wherein the molecular weight of the hindered amine compound is from 2000 to 30000.

11. A polarizer comprising a curable layer of an active energy ray-curable composition on a first film surface, a film and a polarizing element on a second film surface, wherein the film comprises a cellulose acylate, a hindered amine compound in an amount of at least 0.001% by mass relative to the cellulose acylate, and a plasticizer, and satisfying the following conditions (i), (ii), (iiia), and (iiib):
  (i) A concentration C1 of the hindered amine compound at a position of 3 μm from the first film surface in the thickness direction is higher than a concentration C2 of the hindered amine compound at a position of 3 μm from the second film surface in the thickness direction;
  (ii) A concentration A of the plasticizer at the position of 3 μm from the first film surface in the thickness direction is lower than a concentration B of the plasticizer at a position of 10 μm from the first film surface in the thickness direction;
  (iiia) An acyl substitution degree a of the cellulose acylate at the position of 3 μm from the first film surface in the thickness direction is lower than an acyl substitution degree b of the cellulose acylate at the position of 10 μm from the first film surface in the thickness direction;

(iiib) A weight-average molecular weight Ma of the cellulose acylate at the position of 3 μm from the first film surface in the thickness direction is higher than a weight-average molecular weight Mb of the cellulose acylate at the position of 10 μm from the first film surface in the thickness direction, wherein the acyl substitution degree a of the cellulose acylate at the position of 3 μm from the first film surface in the thickness direction is greater than 2.75 and less than or equal to 2.85, wherein the weight-average molecular weight Ma of the cellulose acylate at the position of 3 μm from the first film surface in the thickness direction is from $40 \times 10^4$ to $60 \times 10^4$, wherein the plasticizer comprises at least one selected from the group consisting of carboxylates, polyalcohols, aliphatic dibasic acid esters, acetates, polyesters, epoxy esters, ricinoleate esters, polyolefins, and polyethylene glycol compounds, and wherein the molecular weight of the hindered amine compound is from 700 to 50000.

12. The polarizer according to claim 11, wherein the molecular weight of the hindered amine compound is from 2000 to 30000.

13. A liquid crystal display device which comprises the polarizer according to claim 11.

\* \* \* \* \*